US008213026B2

(12) United States Patent
Sugiyama

(10) Patent No.: US 8,213,026 B2
(45) Date of Patent: Jul. 3, 2012

(54) IMAGE PROCESSING APPARATUS AND METHOD PROVIDING IMPROVED POWER SAVING

(75) Inventor: Hiroki Sugiyama, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1245 days.

(21) Appl. No.: 11/987,737

(22) Filed: Dec. 4, 2007

(65) Prior Publication Data

US 2008/0158574 A1 Jul. 3, 2008

(30) Foreign Application Priority Data

Dec. 28, 2006 (JP) ................. 2006-355221

(51) Int. Cl.
*G06F 3/12* (2006.01)
(52) U.S. Cl. .......... 358/1.1; 358/1.15; 713/320
(58) Field of Classification Search ........... 358/1.1, 358/1.15; 713/320
See application file for complete search history.

(56) References Cited

U.S. PATENT DOCUMENTS

| 2002/0198843 A1* | 12/2002 | Wang et al. ............ 705/51 |
| 2006/0044612 A1* | 3/2006 | Kayama ............ 358/1.15 |
| 2006/0055958 A1* | 3/2006 | Kim et al. ............ 358/1.14 |
| 2006/0098226 A1* | 5/2006 | Morita ............ 358/1.15 |

FOREIGN PATENT DOCUMENTS

| JP | 11-348386 | 12/1999 |
| JP | 2002-086844 | 3/2002 |
| JP | 2004-080092 | 3/2004 |
| JP | 2004080092 | * 3/2004 |
| JP | 2004-106518 | 4/2004 |
| JP | 2005-262709 | 9/2005 |
| JP | 2005-313489 | 11/2005 |
| JP | 2005313489 | * 11/2005 |
| JP | 2005-349747 | 12/2005 |

OTHER PUBLICATIONS

JP2004080092 english machine translation.*
JP2005313489 english machine translation.*

* cited by examiner

*Primary Examiner* — King Poon
*Assistant Examiner* — Iriana Cruz
(74) *Attorney, Agent, or Firm* — George W. Neuner; Edwards Wildman Palmer LLP

(57) ABSTRACT

An image processing apparatus is disclosed connected to a multiple number of external devices by way of a LAN. The apparatus has a main board for expanding the image data received as a print job from one of the external devices and a sub board serving as a connecting port with the LAN. In the power saving mode, the apparatus supplies power to the sub board only, when cutting off power supply to the main board. A time-designated printing data storage stores the data therein when receiving time-designated printing data in the power saving mode. A time-designated printing data extractor extracts at least one set of time-designated printing data, in accord with predetermined conditions, from (i) the sets of time-designated printing data being stored in the time-designated printing data storage and (ii) a newly received set of time-designated printing data. A time-designated printing data forwarding portion transfers the time-designated printing data extracted at the time-designated printing data extractor to an external device that is different from the external device from which the image data was originally transmitted.

8 Claims, 14 Drawing Sheets

FIG. 5

| No.1 | Print job title | Data size | Print completion time | Scheduled power saving mode recovery time | Print order |
|---|---|---|---|---|---|
| 1 | Job A | 2MB | 2006/09/19/ 19:00:00 | 2006/09/19/ 18:58:00 | ③ |
| 2 | Job B | 3MB | 2006/09/19/ 19:00:00 | 2006/09/19/ 18:54:00 | ② |
| 3 | Job C | 5MB | 2006/09/19/ 19:00:00 | 2006/09/19/ 18:50:00 | ① |
| 4 | Job D | 50MB | 2006/09/19/ 21:00:00 | 2006/09/19/ 20:55:00 | ④ |
| 5 | Job E | 2MB | 2006/09/19/ 23:00:00 | 2006/09/19/ 22:58:00 | ⑤ |

IMAGE PROCESSING APPARATUS AND METHOD PROVIDING IMPROVED POWER SAVING

This Nonprovisional application claims priority under 35 U.S.C. §119(a) on Patent Application No. 2006-355211 filed in Japan on 28 Dec. 2006, the entire contents of which are hereby incorporated by reference.

BACKGROUND OF THE INVENTION (1) Field of the Invention

The present invention relates to an image processing apparatus, image processing system and image processing method that outputs an image-processed result of image data received by way of a communication network from information devices such as remote PCs (personal computers) and the like, as well as to an image processing program for making a computer execute the image processing method. The present invention is particularly directed to an image processing apparatus, image processing system and image processing method capable of dealing with time-designated print requests for the image processing apparatus in its power-saving mode, as well as an image processing program for making a computer execute the image processing method.

(2) Description of the Prior Art

As an image processing apparatus that outputs the image-processed result of image data received from without, use of a so-called multi-functional peripheral (MFP) that combines several basic functions including a printer function, scanner function, facsimile function, copier function and the like and also has various functions using network communications, has been widespread. In particular, with the recent development of network communication technologies, there has been rapid evolution of image processing systems which are capable of handling various imaging processes in cooperation with image processing apparatuses including other multi-functional peripheral printers, copiers, scanners, facsimile machines and the like as well as personal computers (which will be written hereinbelow as PCs), by way of communication networks, such imaging processes including, for example, processing of transmission and reception of facsimile data, processing of network printing, processing of transfer of scanned images.

With such an image processing system, the image processing apparatus is connected to a LAN (local area network) constructed by Ethernet (registered trademark) cables etc., and receives print jobs, facsimile transmission jobs and others from remote information devices such as PCs, facsimile machines by way of this communication network. Then, the image processing apparatus subjects the image data included in these jobs to various processes so that the image processed result is output to an image forming portion.

With regards to the above image processing apparatus, in order to disperse the load on the image processing circuitry there are configurations in which sub boards can be optionally installed so as to add extra functions in addition to the main board that executes the operations of image processing. As the examples of sub boards, LAN interface boards, USB interface boards and the like are provided. In general, the main board and sub boards include a CPU (Central Processing Unit) or ASIC (Application Specific Integrated Circuit) for executing programs, flash memory for storing the programs, other memories and the like. The setting information in each image processing apparatus was previously often stored in the memory provided in the main board having a large memory capacity while sub boards were previously components for simply functioning as the interface with external devices by way of communication networks such as LAN etc.

In recent years, Energy-saving law and the International Energy Star Program and the like, demand that image processing apparatuses should be operated with low power consumption. As one of such measures toward power saving, there is a configuration of an image processing apparatus which includes a power saving mode function for suppressing the power consumption of the image processing apparatus as a whole by cutting off electric power supply to the main board while supplying power to the sub boards only when the apparatus has not been operated for a fixed period of time.

Usually, a typical image processing apparatus starts printing (image forming) when it receives a print job from an information device such as a PC or the like, via a communication network. However, there is also a proposal of an image processing apparatus which permits the information device to designate a desired printout time when the device directs the image processing apparatus to perform a print job. The image processing apparatus having the aforementioned power saving mode function has been constructed such that when it receives time-designated printing data as the image data of a print job during the power saving mode, the entire image processing apparatus inclusive of the main board is restored from the power saving mode to deal with the print job.

To deal with this, an image forming apparatus is disclosed in patent document 1 (Japanese Patent Application Laid-open No. 2002-86844), which is constructed so that, in order to suppress power consumption, when the image forming apparatus received time-designated printing data as a print job of image data in its power-saving mode, the CPU on the sub board directly accesses the memory on the main board and stores the time-designated printing data thereinto, to thereby keep up the power-saving mode as long as possible.

However, when time-designated printing data as a print job of image data is received in the power-saving mode, or when time-designated printing data received during the power-saving mode is adapted to be stored in the memory on the sub board, the memory becomes instantly full if the memory capacity of the sub board is made as small as possible. As a result, frequent recoveries from the power-saving mode occur, giving rise to a problem of inability to keep up the power saving mode. On the other hand, when large enough memory capacity is secured in the sub board, this gives rise to the cost increase problem and also the problem of increasing the power consumption during waiting. Further, when time-designated printing is performed in the image processing apparatus, it is necessary to make the apparatus active from the power-saving mode before the designated print completion time, taking into account the time required for image expansion. That is, there is the problem that the power saving mode of the apparatus is shortened by the time required for performing a process of image expansion. Further, when a multiple sets of stored time-designated printing data concentrate on a particular time, previously there occurred the problem that the designated print completion time cannot be kept exactly because each job needs time for the process of image expansion of printing data and for its printing process.

SUMMARY OF THE INVENTION

The present invention has been devised in view of the above problems with the conventional image processing apparatuses, it is therefore an object of the present invention to provide a novel and improved image processing apparatus, image processing system, image processing method and image processing program, which can keep the image processing apparatus in the power saving mode for a longer time even when time-designated printing data as a print job of image data is received in the power saving mode.

In order to achieve the above object, the present invention is configured as follows:

In accordance with the first aspect of the present invention, an image processing apparatus, connected to a plurality of external devices by way of a communication network so as to be able to exchange image data therewith, includes: a main board for expanding the image data received as a print job from one of the external devices into data of printable images; a sub board having a function of connection with the communication network; and a power saving mode function for supplying electric power to the sub board only by cutting off power supply to the main board when the image processing operation has been stopped for a predetermined duration, and is characterized in that the sub board comprises: a time-designated printing data storage which, when time-designated printing data is received as the image data during the power saving mode or while the power saving mode function is activated, stores the time-designated printing data; a time-designated printing data extracting portion for extracting in accordance with a predetermined condition, at least, one set of time-designated printing data from the sets of time-designated printing data being stored in the time-designated printing data storage and a newly received set of time-designated printing data; and a time-designated printing data forwarding portion for transferring the time-designated printing data extracted at the time-designated printing data extracting portion to an external device that is different from the external device from which the image data was originally transmitted.

According to the above configuration, when a new set of time-designated printing data is received after the image processing apparatus has received sets of time-designated printing data in the power saving mode and has stored the sets of time-designated printing data as print jobs into the sub memory as the time-designated printing data storage provided for the sub board, at least one set of time-designated printing data is extracted from the stored sets of time-designated printing data in the sub memory and the newly received set of time-designated printing data, based on data size, print completion time of these sets of data and other various conditions so that the extracted data is transferred to the external device that has been designated in advance. As a result, it is possible to keep up the power saving mode for a longer time without increasing the sub memory capacity or restoring the main board from the power saving mode either, hence enhance the energy saving effect in the main board. Here, concerning the aforementioned external devices, examples of the external device that transmits a print job to the image processing apparatus include information devices and image processing apparatuses such as PCs mobile phones, facsimile machines, scanners and the like, which are previously installed with a driver program (printer driver) for transmitting print jobs to the image processing apparatus via communication network N, whereas examples of the external device to which data is forwarded include information devices and image processing apparatuses such as PCs and printers having the image expansion processing function for expanding the image data into data of printable images.

In the above configuration, the predetermined condition may be the condition that holds when the time-designated printing data extracting portion determined that the data size of the newly received set of time-designated printing data is greater than the empty capacity of the time-designated printing data storage.

With this configuration, in a case where a new set of time-designated printing data is received during the power saving mode when the sub memory has been full of data, at least one set of time-designated printing data is extracted from the stored sets of time-designated printing data in the sub memory and the newly received set of time-designated printing data so that the extracted data is transferred to the external device that has been specified in advance. As a result, it is possible to keep up the power saving mode without restoring the main board from the power saving mode.

In the above configuration, the time-designated printing data extracting portion may include a power saving mode recovery time calculating portion for calculating, based on the data size of the received set of time-designated printing data, the power saving mode recovery time at which the main board will recover from the power saving mode function.

With the above configuration, based on the data size of each received set of time-designated printing data, the time required for its expansion processing and print processing can be calculated. Accordingly, it is possible to calculate the starting time of print processing and starting time of image data expansion of each set of time-designated printing data by calculating backward from the print completion time of each set of time-designated printing data, hence determine the power saving mode recovery time at which the main board should be restored from the power saving mode function. As a result it is possible to positively enhance the energy saving effect in the main board.

In the above configuration, the sub board may include a power saving mode recovery notifier for transmitting a power saving mode recovery signal to the external device to which the set of time-designated printing data was transferred when the apparatus is recovered from the power saving mode.

With this configuration, when the image processing apparatus recovers from the power saving mode earlier than the designated power saving mode recovery time due to some other reasons such as normal reception of printing data or a restoration request through the control panel, provision of the power saving mode recovery notifier makes it possible for the external device at the forwarded destination of time-designated printing data to know the timing of power saving mode recovery of the image processing apparatus. Accordingly, when the external device is holding time-designated printing data that was transferred from the image processing apparatus, the external device can return the time-designated printing data being held therein to the image processing apparatus in time with the power saving mode recovery of the image processing apparatus. Hence, this not only guarantees completion of the printing of the time-designated printing data that was transferred to the external device, by the designated print completion time but can also reduce the processing on the external device.

In the above configuration, the external device to which the set of time-designated printing data is transferred by the time-designated printing data forwarding portion may include an image data expansion processor for expanding the time-designated printing data into data of printable images.

With this configuration, provision of the image data expansion processor for the external device at the forwarded destination enables previous expansion of image data, utilizing the period in which the main board is in the power saving mode. Accordingly, it is possible to shorten the operating time of the main board to complete the print processing, by the time taken for the expansion process of the time-designated printing data that was transferred to the external device. As a result, the power saving mode recovery time of the main board can be delayed as much as possible.

In the above configuration, the time-designated printing data extracting portion may extract sets of time-designated printing data in the order in which the print completion time is earliest, from the sets of time-designated printing data being stored in the time-designated printing data storage and the newly received set of time-designated printing data.

With the above configuration, time-designated printing data is transferred to the external device having an image data expansion processor in the order in which the print completion time is earliest, so that the time-designated printing data can be subjected to image data expansion in the order in which the print completion time is earliest, in advance during the period in which the main board is in the power saving mode. As a result, it is possible to keep up the power saving mode for longer time and reduce the processing in the external device to as low as possible.

In the above configuration, when the time-designated printing data extracting portion extracts sets of time-designated printing data in the order in which the print completion time is earliest, from the sets of time-designated printing data being stored in the time-designated printing data storage and the newly received set of time-designated printing data, if some sets of time-designated printing data have the same print completion time, the time-designated printing data extracting portion may extract sets of time-designated printing data in the order in which the data size is greatest.

With the above configuration, the time-designated printing data can be subjected to image data expansion in the external device in the order in which the data size is greatest among the sets of time-designated printing data that have the same print completion time, in advance during the period in which the main board is in the power saving mode. As a result, it is possible to keep up the power saving mode for longer time and reduce the processing in the external device to as low as possible.

In accordance with another aspect of the present invention, an image processing system includes: a plurality of external devices capable of exchanging image data; and an image processing apparatus including a main board for expanding the image data received as a print job by way of a communication network from one of the external devices into data of printable images and a sub board having a function of connection with the communication network, and is characterized in that the image processing apparatus includes a power saving mode function for supplying electric power to the sub board only by cutting off the power supply to the main board when the image processing operation has been stopped for a predetermined duration,
the sub board comprises: a time-designated printing data storage which, when time-designated printing data is received as the image data while the power saving mode function is activated, stores the time-designated printing data; a time-designated printing data extracting portion for extracting in accordance with predetermined conditions, at least one set of time-designated printing data from the sets of time-designated printing data being stored in the time-designated printing data storage and a newly received set of time-designated printing data; and a time-designated printing data forwarding portion for transferring the time-designated printing data extracted at the time-designated printing data extracting portion to an external device that is different from the external device from which the image data was originally transmitted, and the external device includes an image data expanding portion for expanding the time-designated printing data transferred from the image processing apparatus into data of printable images.

According to the above configuration, when a new set of time-designated printing data is received after the image processing apparatus provided in the image processing system has received sets of time-designated printing data in the power saving mode and has stored the sets of time-designated printing data into the sub memory, at least one set of time-designated printing data is extracted from the stored sets of time-designated printing data in the sub memory and the newly received set of time-designated printing data, based on the data size, print completion time of these sets of data and other various conditions so that the extracted data is transferred to the external device that has been designated in advance. Accordingly, this configuration enables previous expansion of image data of the time-designated printing data whose print completion time is early, utilizing the period in which the main board is in the power saving mode. As a result, it is possible to keep up the power saving mode for longer time by delaying the power saving mode recovery of the main board.

In accordance with still another aspect of the present invention, an image processing method of expanding image data received as a print job via a communication network from one of a plurality of external devices that can exchange image data, includes: a power saving mode entering step for entering a power saving mode when the image processing operation has been stopped for a predetermined period, in which electric power is supplied to a sub board that has a connecting function with the communication network alone while power supply to a main board for expanding the image data into data of printable images is cut off; a time-designated printing data storing step which, when time-designated printing data is received as the image data after the power saving mode entering step, stores the time-designated printing data into a time-designated printing data storage; a time-designated printing data extracting step for extracting, at least one set of time-designated printing data, from the sets of time-designated printing data being stored in the time-designated printing data storage and a newly received set of time-designated printing data, in accordance with a predetermined condition; a time-designated printing data forwarding step for transferring the set of time-designated printing data extracted at the time-designated printing data extracting step to an external device that is different from the external device from which the image data was originally transmitted; a first image data expansion processing step for expanding the set of time-designated printing data received by the external device after the time-designated printing data forwarding step, into data of printable images; a power saving mode recovery step for recovering the main board from the power saving mode; a power saving mode recovery notifying step for transmitting a power saving mode recovery signal to the external device to which the set of time-designated printing data was forwarded, after the power saving mode recovery step; and a second image expansion processing step for causing the main board to expand the sets of time-designated printing data stored in the time-designated printing data storage into data of printable images, after the power saving mode recovery step.

According to the above configuration, when a new set of time-designated printing data is received after the image processing apparatus has received sets of time-designated printing data in the power saving mode and has stored the sets of time-designated printing data as print jobs into the sub memory as the time-designated printing data storage provided for the sub board, at least one set of time-designated printing data is extracted from the stored sets of time-designated printing data in the sub memory and the newly received set of time-designated printing data, based on the data size, print completion time of these sets of data and other various conditions so that the extracted data is transferred to the external device that has been designated in advance. As a result, it is possible to keep up the power saving mode without recovering the main board. Further, this configuration enables previous expansion of image data by the external device at the forwarded destination, utilizing the period in which the main board is in the power saving mode. Accordingly, it is possible to shorten the operating time of the main board to complete the print processing, by the time taken for the expansion process of the time-designated printing data that was transferred to the external device. As a result, the power saving mode recovery time of the main board can be delayed as much as possible.

Finally, another aspect of the present invention resides in an image processing program for causing a computer to execute the image processing method having the above feature.

With the above configuration, by installing the above image processing program in advance into a storage such as flash memory, ROM or the like of the image processing apparatus, it is possible to make the image processing apparatus keep up its power saving mode without causing the recovery of the main board.

Further, this configuration enables previous expansion of image data by the external device at the forwarded destination, utilizing the period in which the main board is in the power saving mode. Accordingly, it is possible to shorten the operating time of the main board to complete the print processing, by the time taken for the expansion process of the time-designated printing data that was transferred to the external device. As a result, the power saving mode recovery time of the main board can be delayed as much as possible.

As has been described above, according to any of the above configurations of the present invention, when the image processing apparatus has received sets of time-designated printing data as printing jobs of image data in the power saving mode, time-designated printing data is transferred to the external device that is connected with the image processing apparatus by way of a communication network. Accordingly, it is possible to prevent the image processing apparatus from recovering frequently from the power saving mode. As a result, it is possible to keep up the power saving mode function of the image processing apparatus as long as possible, hence achieve a sufficient power saving effect.

BRIEF DESCRIPTION OF THE DRAWINGS

FIG. 5 shows an example of received data list of image data including time-designated printing data being stored in a sub memory of the same embodiment;

DESCRIPTION OF THE PREFERRED EMBODIMENTS

Figure 1:
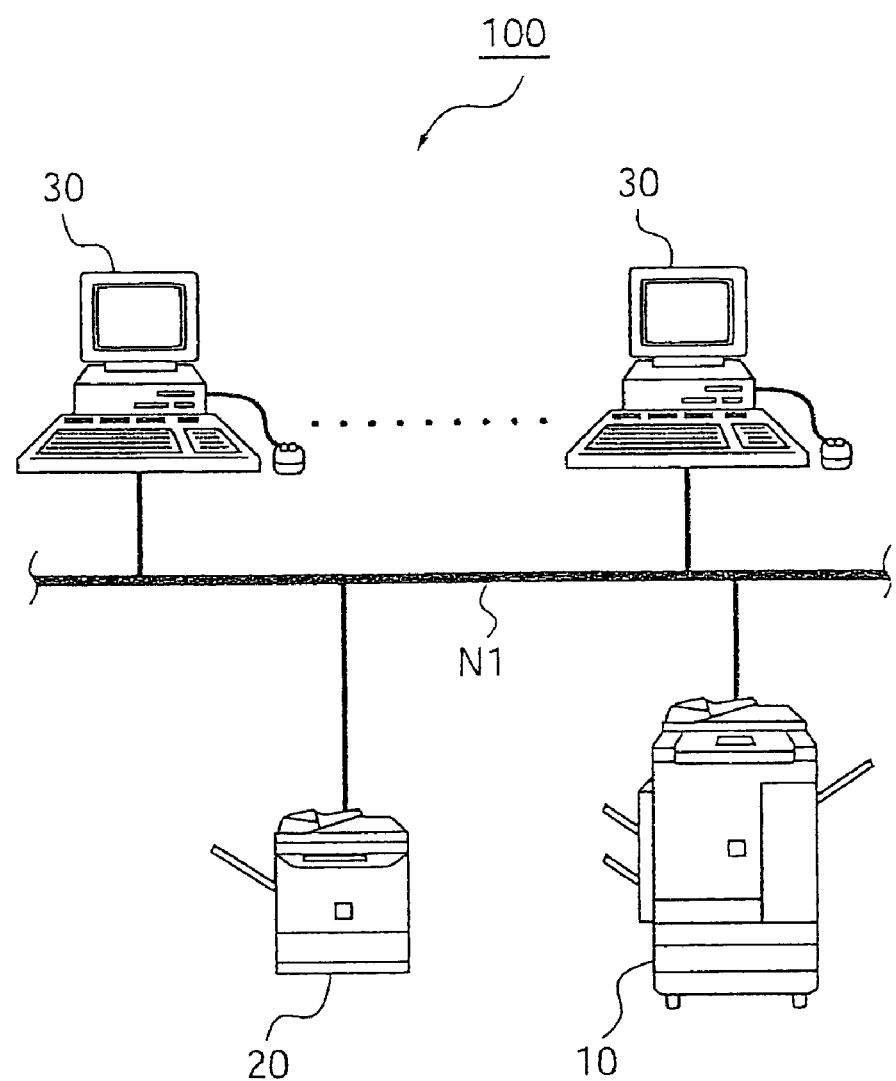
FIG. 1 is a schematic diagram showing an overall configuration of an image processing system according to the first embodiment of the present invention.

The preferred embodied modes of the present invention will hereinafter be described in detail with reference to the accompanying drawings. In the specification and drawings, components having almost the same functional configurations are allotted with the same reference numerals so that repeated description is omitted.

Figure 2:
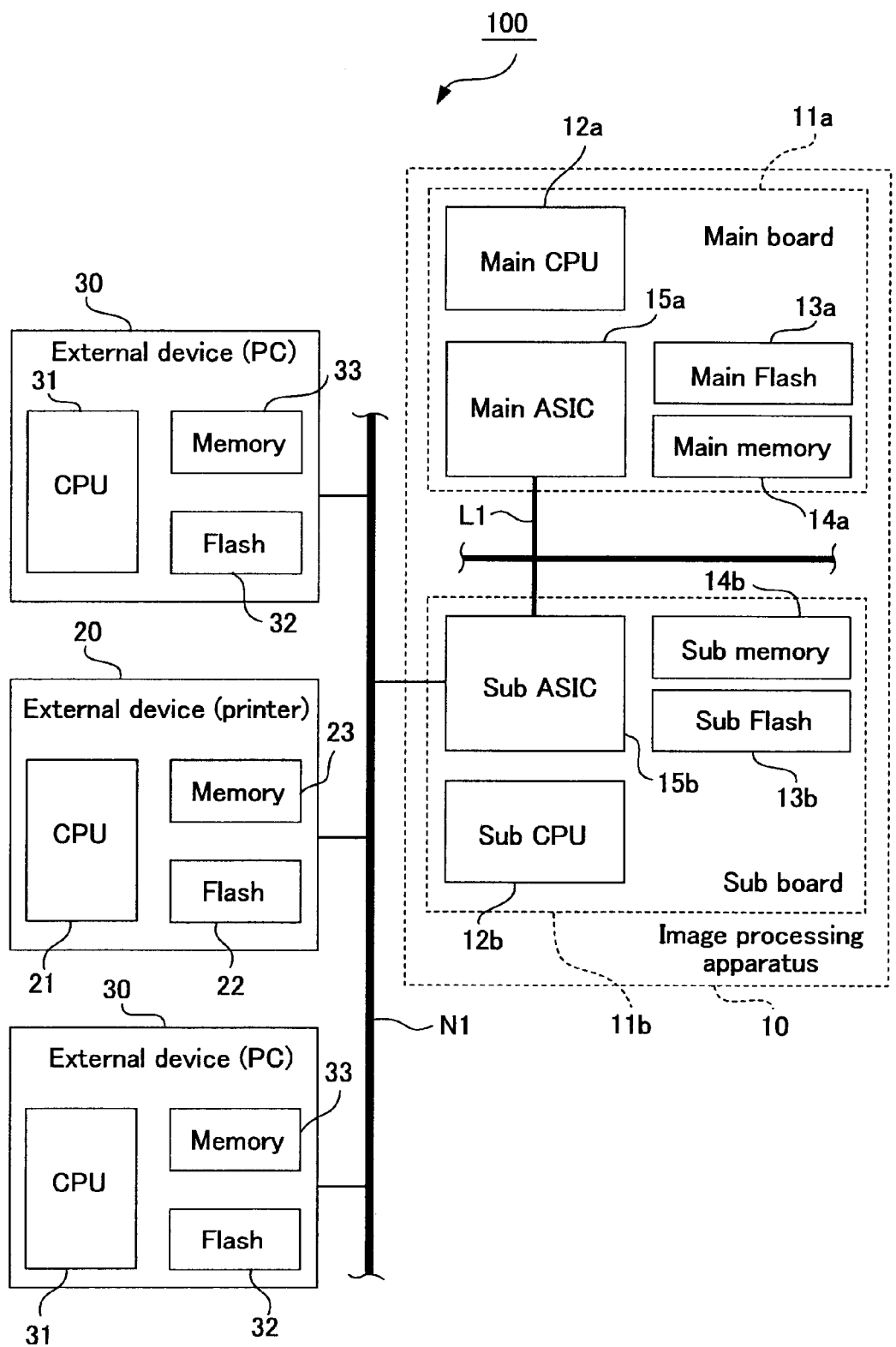
FIG. 2 is a system configurational diagram of the image processing system of the same embodiment, specifically is a block diagram showing a schematic electric configuration of the image processing apparatus and external devices.

To being with, the first embodiment of an image processing apparatus according to the present invention is applied to a multi-functional machine, and a configuration of an image processing system including this multi-functional machine will be described with reference to the drawings. FIG. 1 is a schematic view showing an overall configuration of an image processing system according to the present embodiment. FIG. 2 is a system configurational diagram of the image processing system of the embodiment shown in FIG. 1, specifically is a block diagram showing a schematic electric configuration of the image processing apparatus and external devices.

In an image processing system 100 according to the present embodiment, a multi-functional machine 10, a printer 20 and a plurality of PCs are connected through a communication network N1 such as a LAN constructed by Ethernet (registered name) cables etc. Here, the types and number of image processing apparatuses and information devices connected to communication network N1 in image processing system 100 are not limited to that shown in FIG. 1. Specifically, image processing apparatuses such as scanner devices, facsimile machines etc., information terminal devices and information devices such as mobile telephones, PDAs etc., may also be connected.

Multi-functional machine 10 is an image processing apparatus having various functions using network communications as well as basic functions such as a scanner function, copying function, facsimile function, printer function etc., and is connected to a plurality of PCs 30, . . . 30, in which a driver program (printer driver) for using multi-functional machine 10 via communication network N1 has been installed beforehand. These PCs 30, . . . 30, each prepare print jobs of documents, graphics, etc., by the printer driver, and transmit them to multi-functional machine 10 or another printer 20 by way of communication network N1 to execute the printing processes.

Multi-functional machine 10 as the image processing apparatus of the present embodiment has as one of a variety of functions utilizing the aforementioned communication network N1, a time-designated printing function by which a desired printout time can be designated when an information device such as PC 30 or the like that is connected to communication network N1 directs multi-functional machine 10 to perform printing. Further, in order to reduce the total power consumption of multi-functional machine 10 when the machine has not been operated for a fixed period of time with its power activated, multi-functional machine 10 has a power saving mode function for controlling itself to drive the necessary minimum part by supplying power to only part of the electric circuits of multi-functional machine 10.

Connected to communication network N1 is a zone management server (not shown) for managing the information on the zones that share the communication network N1. This zone management server manages information on users that belong to each zone and specifies the zones which are allowed to use each image processing apparatus such as multi-functional machine 10, printer 20 or the like. Further, communication network N1 is connected to a wider area communication network (not shown) so that information can be exchanged with the terminals (not shown) on another communication network for different zones, via this communication network.

Image processing apparatus (multi-functional machine) 10 of the present embodiment includes, as shown in FIG. 2, a main board 11a as a printer controller for performing image processing etc., and a sub board 11b which is optionally installed to add necessary functions. Here in the present embodiment, sub board 11b is a LAN interface board that functions as an interface portion with external devices such as PCs 30 and printer 20 by way of communication network N1 forming a LAN or the like.

Main board 11a includes: a main board side CPU 12a (which will be referred to hereinbelow as main CPU 12a) for executing a variety of image processing; a main board side Flash 13a (which will be referred to hereinbelow as main Flash 13a) such as flash memory or the like serving as a non-volatile read only storage that stores image processing programs to run on the main CPU 12a; a main body side memory 14a (which will be referred to hereinbelow as main memory 14a) such as RAM (Random Access Memory) etc., serving as a readable and writable storage by main CPU 12a; and a main board side ASIC (Application Specific Integrated Circuit) 15a (which will be referred to hereinbelow as main ASIC 15a) made up of logic circuits etc. including readable and writable registers from main CPU 12a.

On the other hand, sub board 11b includes: a sub board side CPU 12b (which will be referred to hereinbelow as sub CPU 12b) for executing a variety of operational processing in the sub board 11b; a sub board side Flash 13b (which will be referred to hereinbelow as sub Flash 13b) such as flash memory or the like serving as a read only storage that stores operational processing programs to run on the sub CPU 12b; a sub board side memory 14b (which will be referred to hereinbelow as sub memory 14b) such as RAM etc., serving as a readable and writable storage for sub CPU 12b; and a sub board side ASIC 15b (which will be referred to hereinbelow as sub ASIC 15b) made up of interface circuitry which enables CPU 12b to perform input and output to external terminals by reading and writing therefrom. Here, since the image processing program according to the present invention is associated with the operational control of the sub board, it is stored in sub Flash 13b. Sub ASIC 15b is also connected to main ASIC 15a byway of a transmission path L1 for performing serial communication.

In the present embodiment, when image processing apparatus 10 is switched into the aforementioned power saving mode, the apparatus is controlled so that the necessary minimum part is driven by cutting off the power supply to main board 11a and supplying power only to sub board 11b that has the function of interfacing with communication network N1.

The external devices connected to multi-functional machine 10 via communication network N1, specifically, PCs 30 and printer 20 include, respectively, CPUs 31 and 21 for performing various operational processes, Flashes 32 and 22 such as flash memory etc., serving as read only storages for storing the associated programs of the processes, and memories 33 and 23 such as RAM etc., serving as readable and writeable storages by CUP 31 and 21.

Figure 3:
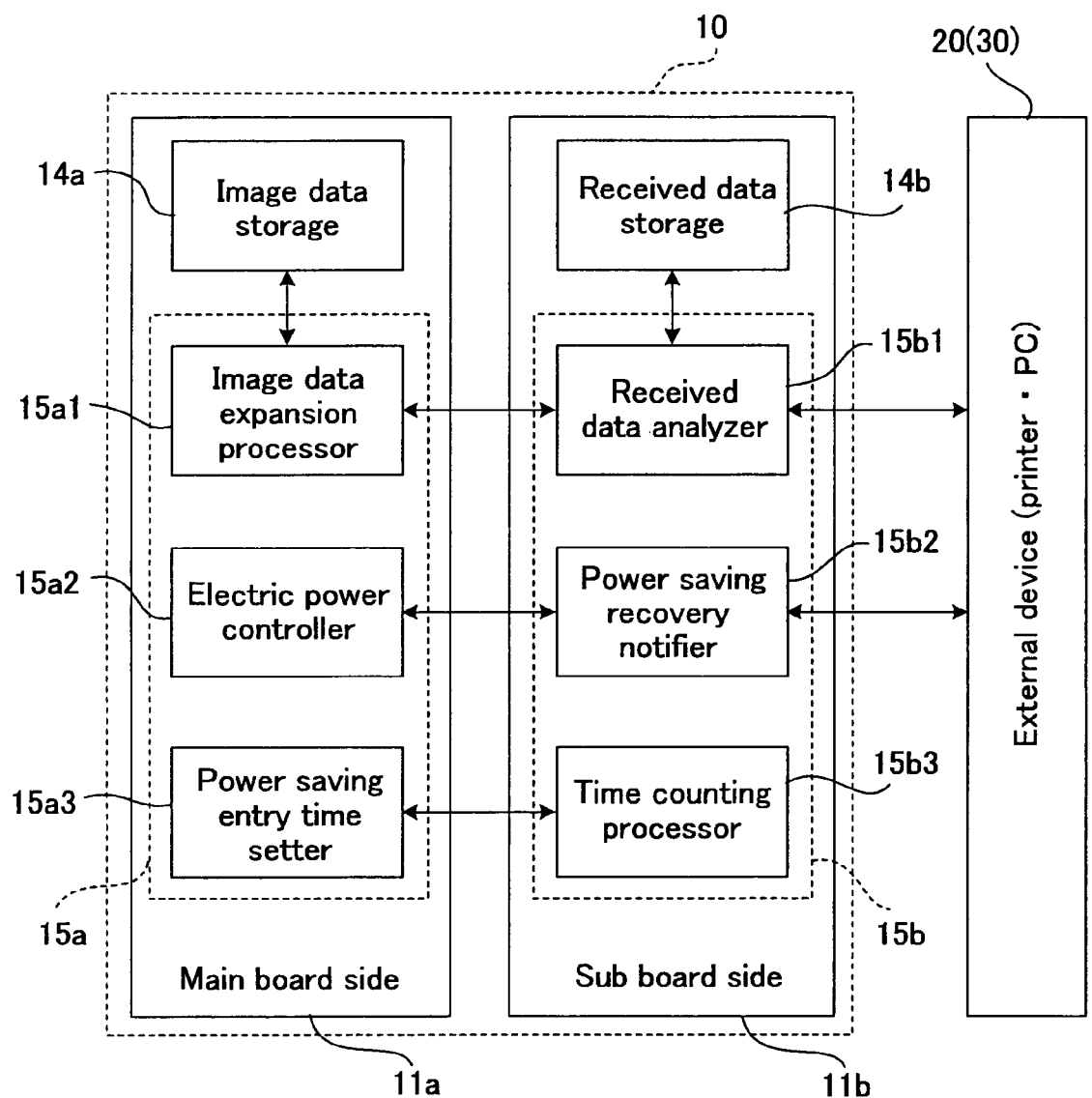
FIG. 3 is a functional block diagram showing the image processing apparatus of the same embodiment.
Figure 4:
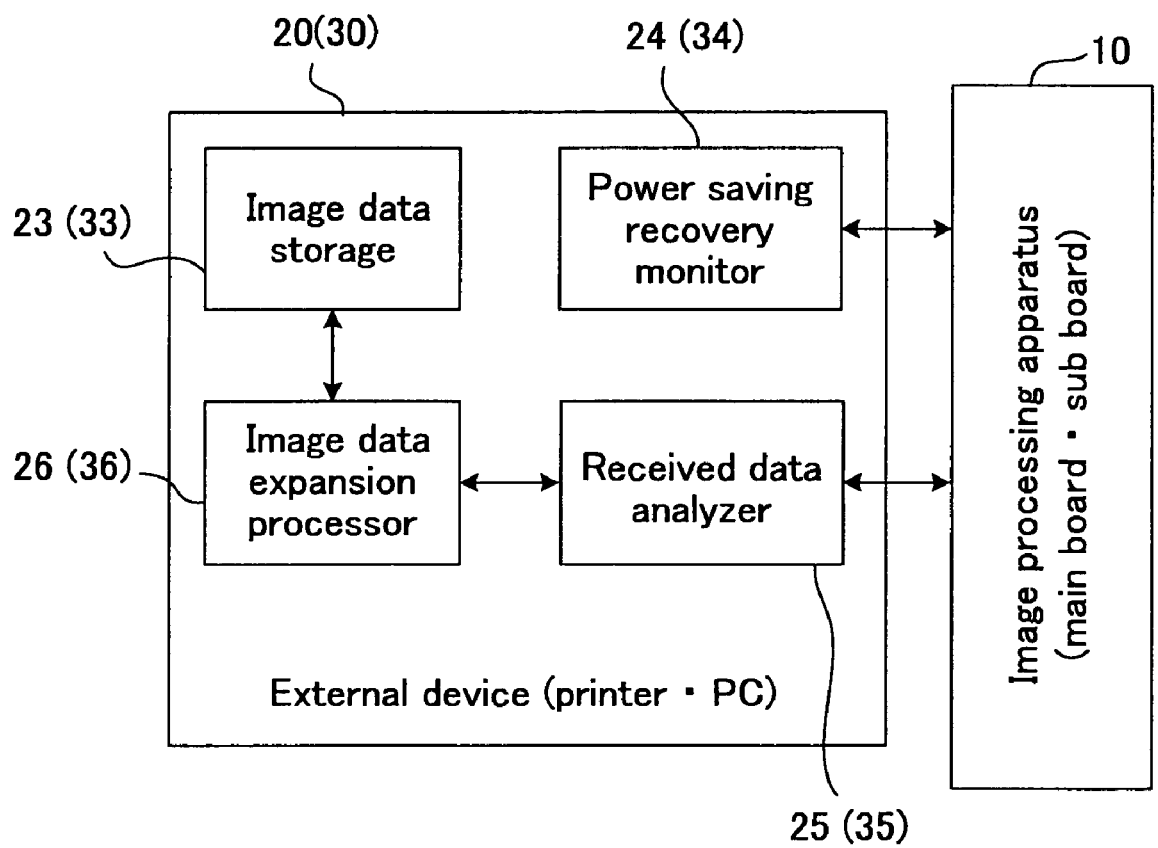
FIG. 4 is a functional block diagram showing external devices of the same embodiment.

Next, the function of each component provided for image processing system 100 of the present invention will be described with reference to the drawings. FIG. 3 is a functional block diagram showing the image processing apparatus of the present embodiment, and FIG. 4 is a functional block diagram showing external devices of the present embodiment.

Image processing apparatus 10 of the present embodiment includes sub board 11b that provides the interfacing function when a print job is received from PC 30 via communication network N1 and main board 11a.

Sub board 11b includes received data storage 14b (sub memory 14b), a received data analyzer 15b1, a power saving mode recovery notifier 15b2 and a time counting processor 15b3.

On the other hand, main board 11a includes image data storage 14a (main memory 14a), an image data expansion processor 15a1, an electric power controller 15a2, a power-saving entry time setter 15a3.

Received data analyzer 15b1, when receiving a print job from one, for example PC 30, of information devices that are installed with a printer driver, among the external devices that are connected via communication network N1, analyzes the associated data included in the image data of the print job. Examples of the data analyzed by received data analyzer 15b1 include the data size, the print completion time and the like of the image data of the received print job.

Received data analyzer 15b1 also calculates, based on the data size of the analyzed image data, the time for image data expansion processing and the time for print processing, and calculates, based on the calculated time for expansion processing and the time for print processing, the power saving mode recovery time, taking the time for image processing apparatus 10 to recover from the power saving mode. The thus calculated scheduled power saving recovery time (calculated result) is transmitted to power saving recovery notifier 15b2.

Further, received data analyzer 15b1 has a function of transmitting the image data contained in the received print job to any one of image data expansion processor 15a1 provided on main board 11a, received data storage 14b (sub memory 14b) provided on sub board 11b and other external devices such as PCs 30, printer 20 and the like connected with image processing apparatus 10 via communication network N1, in accordance with the analyzed result of the data. In other words, received data analyzer 15b1, when receiving a print job, transmits the image data contained in the received print job to any one of image data expansion processor 15a1, received data storage 14*b* and other external devices 20 and 30, in accordance with predetermined conditions.

In this case, the destination to which the image data will be transmitted depending on the predetermined conditions is made different depending on whether main board 11*a* is being power supplied or in the normal state after recovery from the power saving mode, or the image processing apparatus 10 is in the power saving mode.

When main board 11*a* is power supplied or in the normal state after recovery from the power saving mode, the image data of the received print job is transmitted to image data expansion processor 15*a*1 so as to be expansion-processed.

When the image processing apparatus 10 is in the power saving mode, and if the received image data is time-designated printing data, the time-designated printing data is transferred to either sub memory 14*b* or one of external devices 20 and 30 connected to communication network N1, depending on the data size of the time-designated printing data and/or the designated printing time. The method of determining the destination to which the time-designated printing data should be transferred when image processing apparatus 10 is in the power saving mode, either sub memory 14*b* or one of external devices 20 and 30, will be described later.

When the print job received during the power saving mode is image data including time-designated printing data, in order to complete the printing of the images corresponding to the received print job at the time designated by the time-designated printing data or by the designate print completion time, power saving recovery notifier 15*b*2 has a function of transmitting a power saving recovery signal that notifies recovery from the power saving mode, at the scheduled power saving recovery time that is calculated by received data analyzer 15*b*1 by taking into account the time required for image processing apparatus 10 to recover from the power saving mode, to electric power controller 15*a*2 provided on main board 11*a*, received data analyzer 15*b*1 provided on sub board 11*b* and external device 20 or 30 to be the designation to which the image data is transferred.

Time counting processor 15*b*3 has a function of measuring the elapsed time of signal processing in sub board 11*b*. In the present embodiment, it measures the time for actuating main board 11*a* from the power saving mode, and indicates thereof to the power saving recovery notifier 15*b*2 when the scheduled power saving recovery time has arrived.

Image data expansion processor 15*a*1 functions such that, when receiving image data via sub board 11*b* that forms interface with external devices 20 and 30, the processor expands the image data into a form that can be output as images by image forming portion (not shown), and transfers the images, i.e., the image data after expansion, to image data storage, (main memory) 14*a*. Further, since image data expansion processor 15*a*1 cannot perform parallel expansion processes of multiple sets of image data at the same time, if multiple sets of image data are received at the same time, the processor performs expansion process of the sets of image data one by one in serial order, by performing the expansion process of one set of image data then handling the next set of image data. The term "expansion process" mentioned here means a process of expanding image data in the received data by the image processing apparatus into a data format that can be understood by the image forming portion (not shown) of the image processing apparatus.

Electric power controller 15*a*2 has a function of controlling the electric power to main board 11*a*. In the present embodiment. This controller cuts off the power to main board 11*a* when receiving an power-saving entry signal from power saving recovery notifier 15*b*2 to switch main board 11*a* into the power saving mode, and recovers the normal electric power to main board 11 when receiving a power saving recovery signal.

Power-saving entry time setter 15*a*3 has a function of setting up a predetermined time that indicates the non-operated duration of image processing apparatus 10 when main board 11*a* of image processing apparatus 10 switches into the power saving mode and notifying the starting time of the non-operated duration of image processing apparatus 10 and the above predetermined time to time counting processor 15*b*3 provided on sub board 11*b*.

On the other hand, external devices (printer 20, PCs 30) of the present embodiment, as shown in FIG. 4, each include an image data storage 23(33), a power saving recovery monitor 24(34), a received data analyzer 25(35) and an image data expansion processor 26 (36).

Power saving recovery monitor 24 (34) has a function of monitoring reception of a power saving recovery signal from power saving recovery notifier 15*b*2 provided for image processing apparatus 10, and instructs image data storage 23(33) to send back the image data including time-designated print data that was transferred from image processing apparatus 10, to image processing apparatus 10 when power saving recovery monitor 24(34) has received the power saving recovery signal.

Received data analyzer 25(35), when it receives the image data including the time-designated print data transferred from image processing apparatus 10, analyzes each of the associated data such as the designated printing time, data size, etc., included in the image data and then transmits the received image data to image data expansion processor 26 (36).

Image data expansion processor 26(36) has the function of expanding the image data including the designated printing time data, transferred from image processing apparatus 10 into data of images printable by the image forming portion (not shown) of image processing apparatus 10 and transmitting the image, i.e., the expanded image data, to image data storage 23(33).

Next, the received data list of image data including time-designated printing data being stored in received data storage (sub memory) 14*b* provided for sub board 11*b* in image processing apparatus 10 of the present embodiment will be described with reference to the drawings. FIG. 5 shows one example of the received data list of image data including time-designated printing data being stored in received data storage (sub memory) 14*b* provided on sub board 11*b* in image processing apparatus 10 of the present embodiment.

As shown in FIG. 5, in the received data list stored in sub memory 14*b*, for each of the jobs of image data including time-designated printing data received by received data analyzer 15*b*1 of sub board 11*b*, its print job title, data size, print completion time, scheduled power saving recovery time and print order are listed, item by item.

Print job title, data size and print completion time are the data that is analyzed by received data analyzer 15*b*1 when image data including time-designated printing data is received as a print job from one of the information devices including PCs 30 among the external devices connected via communication network N1. Here, "print completion time" written in the received data list is used as a meaning that indicates "printing should be completed at the print completion time". However, "print completion time" may be interpreted as a meaning that indicates "printing should have been completed by the designated print completion time", so as to permit such system in which, if an event that makes the apparatus restore the normal operating mode from the power saving mode such as reception of a print job or the like, occurs before the designated print completion time, all the stored jobs of time-designated printing data are processed without regard to their print completion times.

The order of printing described in the received data list is determined in principle, in the sequential order of the print completion times. However, if there are a plurality of print jobs having the same print completion time as Job A, Job B and Job C shown in FIG. 5, it is assumed that the print jobs are executed in the order in which the time required to complete the job is longest or in the order in which the size of the received data is largest, on the basis that printing of each job is completed before the print completion time, in order to keep up the power saving mode as long as possible when whole or part of stored data in sub memory 14b has to be transferred to external devices 20 and 30 if sub memory 14b becomes full in the future. In the case of the received data list shown in FIG. 5, as to the data size of Job A, Job B and Job C, Job C is the largest, Job B is the second largest and Job A is the smallest, so that printing processes are done in the order of Job C, Job B and Job A.

When the image data of a print job received by image processing apparatus 10 in the power saving mode includes time-designated printing data, in order to complete the printing of the images corresponding to the received print job at the designate print completion time, designated by the time-designated printing data, or by the designate print completion time, the scheduled power saving recovery time is calculated at received data analyzer 15b1, taking into account the time required for main board 11a of image processing apparatus 10 to recover from the power saving mode. The calculated result of the scheduled power saving recovery time is transmitted to received data storage 14b and written into the received data list that is stored in this received data storage 14b.

When there are a plurality of print jobs with the same print completion time as Job A, Job B and Job C shown in FIG. 5, the print jobs are executed in the order in which the time required to complete printing is longest or in the order in which the size of the received data is largest as stated above, so that the scheduled power saving recovery times are set earlier in the order in which the size of received data is largest. Here, since it is acceptable to execute printing of a received print job if the job has been completed by its designated print completion time, when the print completion times of some jobs like Job D and Job E are designated much later than those of Job A, Job B and Job C the scheduled power saving recovery time may be set up so that all the jobs may be made active continuously, one to another from the power-saving mode. That is, the scheduled power saving recovery time of Job D may be set at a time, for example 19:00, 2006/09/19, which is directly after the scheduled power saving recovery time of Job A that is the job immediately before in sequential order, instead of finishing Job D just before its print completion time, and the scheduled power saving recovery time of Job E may be set at a time directly after Job D, or 19:05, 2006/09/19. In this way, even if the print completion times and the power saving recovery times are designated discreetly, the scheduled power saving recovery times of individual jobs may be set continuously. As a result it is possible to empty sub memory 14b early, hence secure a greater capacity for storing subsequently received image data. Further, the number of repeated recoveries from the power saving mode can be reduced to thereby expect saving in the power consumption of image processing apparatus 10.

Figure 6:
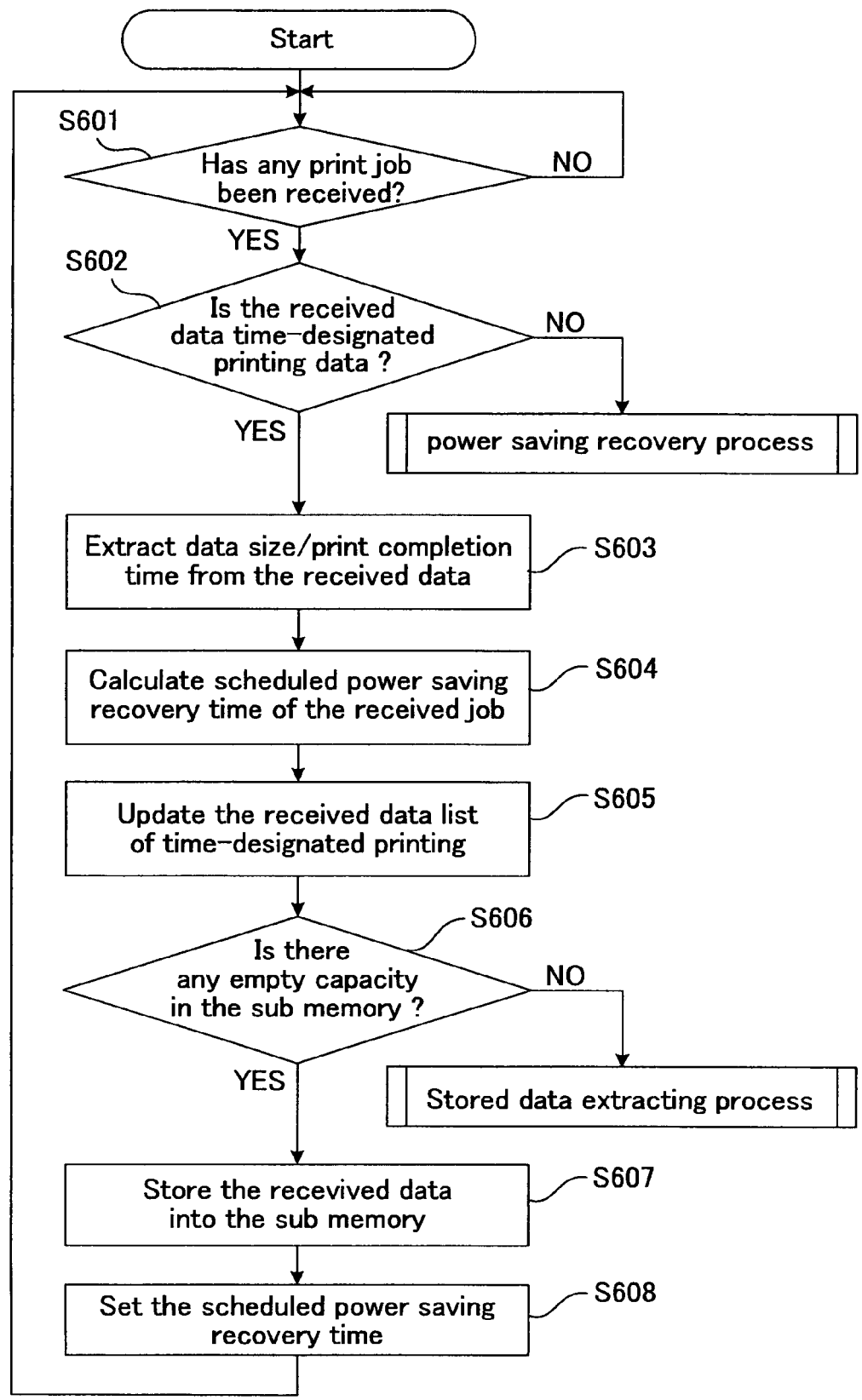
FIG. 6 is a flow chart for illustrating the operation effected on the sub board side when a print job is received in the power saving mode in the image processing apparatus of the same embodiment.
Figure 7:
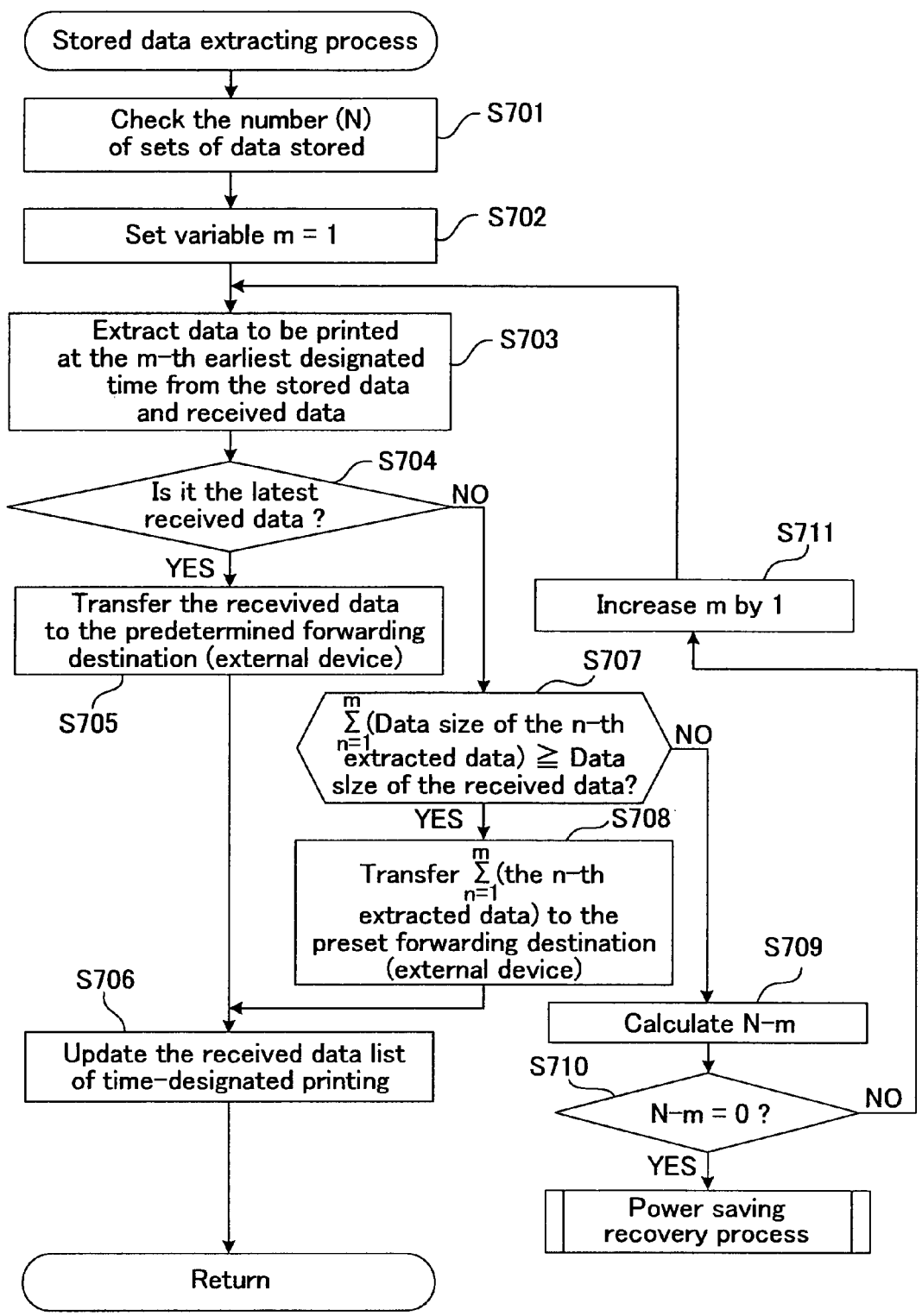
FIG. 7 is a flow chart showing a stored data extracting process effected in the image processing apparatus of the same embodiment.
Figure 8:
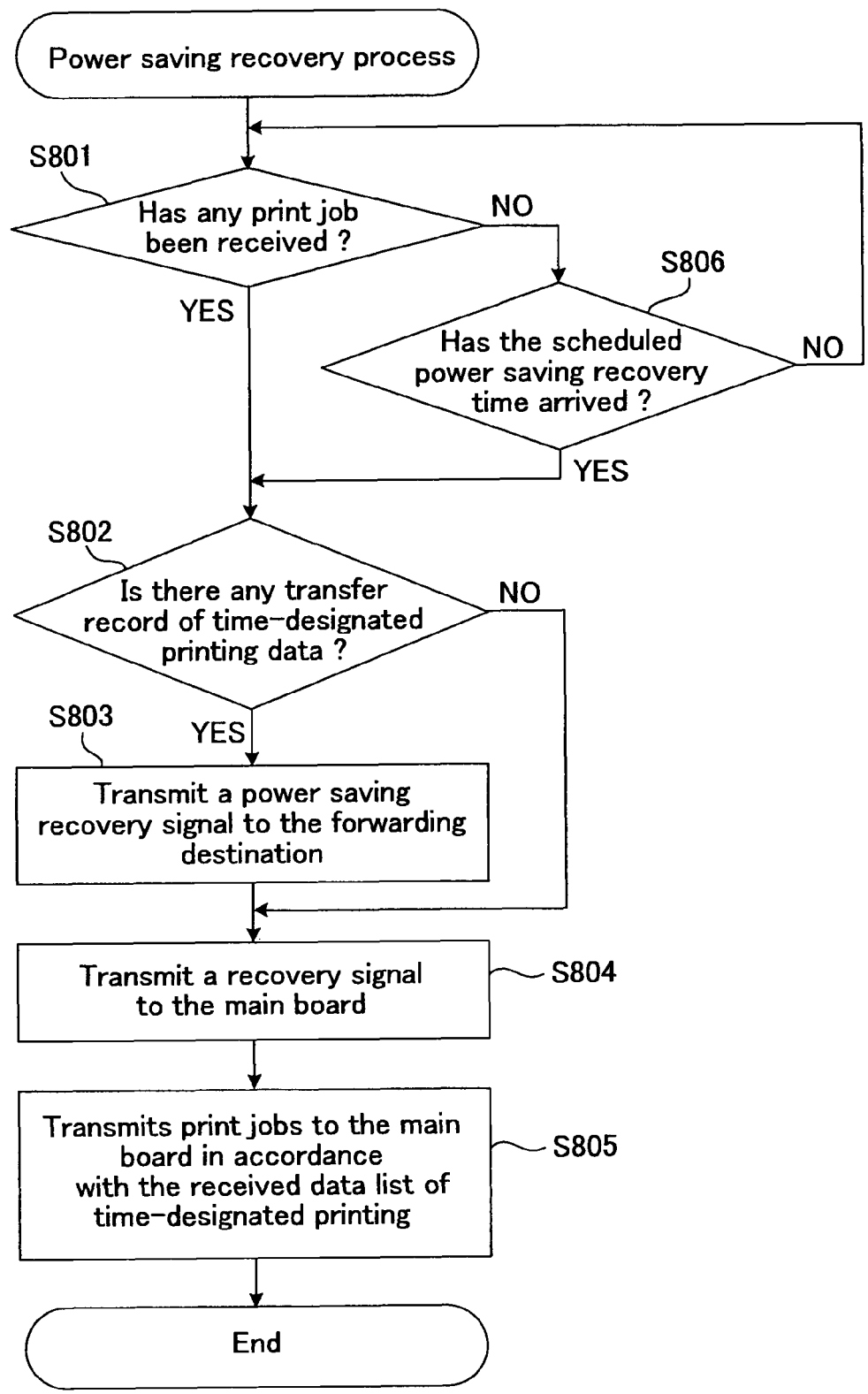
FIG. 8 is a flow chart showing a power saving recovery process effected in the image processing apparatus of the same embodiment.

Next, the operation of image processing in image processing apparatus 10 of image processing system 100 in the present embodiment will be described with reference to the drawings. FIG. 6 is a flow chart for illustrating the operation effected on the sub board side when a print job is received in the power saving mode of the image processing apparatus of the present embodiment. FIG. 7 is a flow chart showing a stored data extracting process effected in the image processing apparatus of the present embodiment. FIG. 8 is a flow chart showing a power saving mode recovery process effected in the image processing apparatus of the present embodiment.

First, as shown in FIG. 6 it is determined whether sub ASIC 12b of sub board 11b has received a print job during the power-saving mode of image processing apparatus 10 (Step S601). As reception of a print job is detected at this step S601, it is determined in received data analyzer 15b1 whether the image data of the print job is time-designated print data (Step S602). On the other hand, no print job is detected at Step S601, the operation is repeated from Step S601 to check whether a print job is received.

When the image data of the print job is determined to be time-designated printing data at Step S602, received data analyzer 15b1 extracts the data size, print completion time and other associated data included in the received time-designated printing data, from the received time-designated printing data (received data) (Step S603). On the other hand, when the image data of the print job has been determined not to be time-designated printing data at Step S602, the operation enters the power saving recovery process shown in FIG. 8. The operation flow of the power saving recovery process will be described later.

When the data size and print completion time has been extracted from the received data at Step S603, received data analyzer 15b1 having a function of a power saving recovery time calculator calculates the scheduled power saving recovery time for the received print job, based on the extracted data (Step S604). Then, based on the associated data (print job title, data size, print completion time, scheduled power saving recovery time, print order) extracted and analyzed by received data analyzer 15b1, the received data list (FIG. 5) of time-designated print jobs, which is created in sub memory 14b serving as time-designated printing data storage is updated (Step S605).

When the received data list of time-designated print jobs has been updated at Step S605, then received data analyzer 15b1 checks whether there is sufficient empty capacity for storing received data in sub memory 14b (Step S606). When it has been determined at Step S606 that there is enough empty capacity in sub memory 14b, the received data is stored into sub memory 14b (Step S607). Then, based on the received data list updated at Step S605, received data analyzer 15b1 sets up the scheduled power saving recovery time for restoring the power to main board 11a (Step S608). On the other hand, when it has been determined that there is not enough empty capacity in sub memory 14b, the operation goes into a stored data extracting process shown in FIG. 7 to extract the received data that should be transferred to external devices 20, 30, from all sets of received data that have been stored in the sub memory 14b.

In the stored data extracting process, as shown in FIG. 7, first, received data analyzer 15b1 obtains the number (N) of sets of received data (stored data) having been stored in sub memory 14b (Step S701). Next, with a variable m that indicates the number of times of executing the process of extracting stored data in sub memory 14b set at 1 (Step S702), received data analyzer 15b1 functioning as a time-designated printing data extractor, extracts the set of data that has been scheduled to be printed out first, from the sets of data stored in sub memory 14b and the latest received data (Step S703).

Then, it is determined by received data analyzer 15b1 whether the data extracted at Step S703 is the latest received data (Step S704). In this Step S704, if the data extracted at Step S703 has been determined to be the latest received data, received data analyzer 15b1 functioning as a time-designated printing data transmitter, transfers the received data to the external device (printer 20, PC 30) that has been previously determined to be the forwarding destination (Step S705). Then, the received data list of time-designated printing jobs, created in memory 14b is updated (Step S706), and the operation returns to the top of the stored data extracting process.

On the other hand, when, at Step S704, the data extracted at Step S703 is determined not to be the latest received data, the size relationship between the two sets of data is examined by comparing the data size of the extracted data, extracted as the set of stored data that is scheduled to be printed out first among the sets of received data (stored data) residing in sub memory 14b with the data size of the latest received data (Step S707).

When the size of the extracted data or the set of stored data in sub memory 14b that is scheduled to be printed out first is determined to be greater than the size of the latest received data at Step S707, the extracted data is transferred to the previously designated external device (printer 20 or any of PCs 30) as the forwarding destination (Step S708). Then, the received data list of time designated print jobs, formed in sub memory 14b is updated (S706) since the extracted data stored in sub memory 14b is replaced by the latest received. Then the operation returns to the start of the stored data extracting process.

On the other hand, when the data size of the extracted data or the set of stored data in sub memory 14b that is scheduled to be printed out first is determined to be smaller than the size of the latest received data at Step S707, N–m (the number of stored sets of data, N minus the repeated number of the loop, m) is calculated (Step S709). After this step S709, it is determined whether N–m is 0 (Step S710). That is, this loop will be repeated maximum N times.

When N–m calculated at Step S709 is determined to be 0 at Step S710, this indicates that the data size of the received data is greater than the capacity of sub memory 14b, it is hence necessary to restore the electric power supply to main board 11a. That is, the operation goes to the power saving recovery process for recovering from the power saving mode shown in FIG. 8. When, at Step S710, N–m is determined to be 1 or greater, variable m that indicates the number of times of executing the process of extracting stored data in sub memory 14b, is incremented by 1 (here at the first loop, m is set at 2) (Step S711).

Then, the operation returns to Step S703, where the set of data that is scheduled to be printed out second of all the sets of data stored in sub memory 14b and the latest received data (Step S703), is extracted. Then, it is determined whether the extracted data is the received data (Step S704). When the set of data that is scheduled to be printed out second is determined not to be the latest received data, the relationship between the sum of the data sizes of the first and second sets of extracted data, and the data size of the received data is examined (Step S707).

When the sum of the data sizes of the first and second sets of extracted data is determined to be greater than the size of the received data at Step S707, the first and second sets of extracted data are transferred to the previously designated external device (printer 20 or any of PCs 30) as the forwarding destination (Step S708). Then, the received data list of time designated print jobs, formed in sub memory 14b is updated (S706) since the sets of extracted data which were stored in sub memory 14b and transferred therefrom were replaced by the latest received data. Then the operation returns to the start of the stored data extracting process.

On the other hand, when the size of the received data is greater than the sum of the data sizes of the first and second sets of extracted data at Step S707, N–m is calculated (Step S709). After this step S709, it is determined whether N–m is 0 (Step S710).

When N–m calculated at Step S709 is determined to 0 at Step S710, this indicates that the data size of the received data is greater than the capacity of sub memory 14b, it is hence necessary to restore the electric power supply to main board 11a. That is, the operation goes to the power saving recovery process shown in FIG. 8. When, at Step S710, N–m is determined to be 1 or greater, variable m that indicates the number of times of executing the process of extracting stored data in sub memory 14b is incremented by 1 (here at the second loop, m is set at 3) (Step S711). Afterwards, the same loop of Steps S703 to S711 is repeated if necessary until N–m becomes equal to 0 or the process of extracting stored data in sub memory 14b is repeated the number of times equal to the number of all the sets of stored data in sub memory 14b.

The power saving recovery process (FIG. 8) is the operating process for causing image processing apparatus 10 to return to the normal state from the power saving mode function, and is executed when a usual print job of image data not including time-designated printing data has been received or when the scheduled power saving recovery time has arrived.

When the power saving recovery process is effected, it is determined first whether a print job has been received by sub ASIC 15b on sub board 11b (Step S801). When reception of a print job has been detected at Step S801, whether there is any transfer record of time-designated printing data to external devices 20 and 30 is checked by received data analyzer 15b1 (Step S802).

When, at Step S802, it is detected that there is a record that time-designated printing data has been transferred to any of external devices 20 and 30, the power saving mode notifying portion, namely, power saving recovery notifier 15b2 transmits a power saving recovery signal to the external device 20 or 30 to which data was transferred (Step S803). Then, power saving recovery notifier 15b2 transmits a power saving recovery signal to electric power controller 15a2 provided on main board 11a to restore the power supply to main board 11a (Step S804).

After restoration of electric power supply to main board 11a, based on the received data list of time-designated print jobs stored in sub memory 14b, the image data of the print jobs stored in sub memory 14b and the image data of the print jobs stored in memory 23 (33) as the image data storage of external device 20 or 30 are transmitted to image data expansion processor 15a1 (Step S805), to complete the power saving recovery process.

On the other hand, when reception of any print job has not been detected at Step S801, it is determined whether the scheduled power saving recovery time has arrived (Step S806). When it is determined that the scheduled power saving recovery time has arrived, whether there is any transfer record of time-designated printing data to external device 20 or 30 is checked by received data analyzer 15b1 (Step S802). When it is determined that the scheduled power saving recovery time has not yet arrived at Step S806, the operation returns to Step S801, and it is determined once again whether a print job has been received.

When it is detected at Step S802 that there is a record that time-designated printing data has been transferred to any of external devices 20 and 30, power saving recovery notifier 15*b*2 transmits a power saving recovery signal to the external device 20 or 30 to which data was transferred (Step S803). Then, power saving recovery notifier 15*b*2 transmits a power saving recovery signal to electric power controller 15*a*2 provided on main board 11*a* to restore electric power supply to main board 11*a* (Step S804).

On the other hand, when it is detected at Step S802 that there is no transfer record of time-designated printing data, power saving recovery notifier 15*b*2 transmits a power saving recovery signal to electric power controller 15*a*2 provided on main board 11*a* so as to restore electric power supply to main board 11*a* (Step S804).

After restoration of electric power supply to main board 11*a*, based on the received data list of time-designated print jobs stored in sub memory 14*b*, sets of the time-designated printing data having been stored in external devices 20, 30 and sub memory 14*b* are transmitted to image data expansion processor 15*a*1 on main board 11*a* (Step S805) to complete the power saving mode recovery process.

Figure 9:
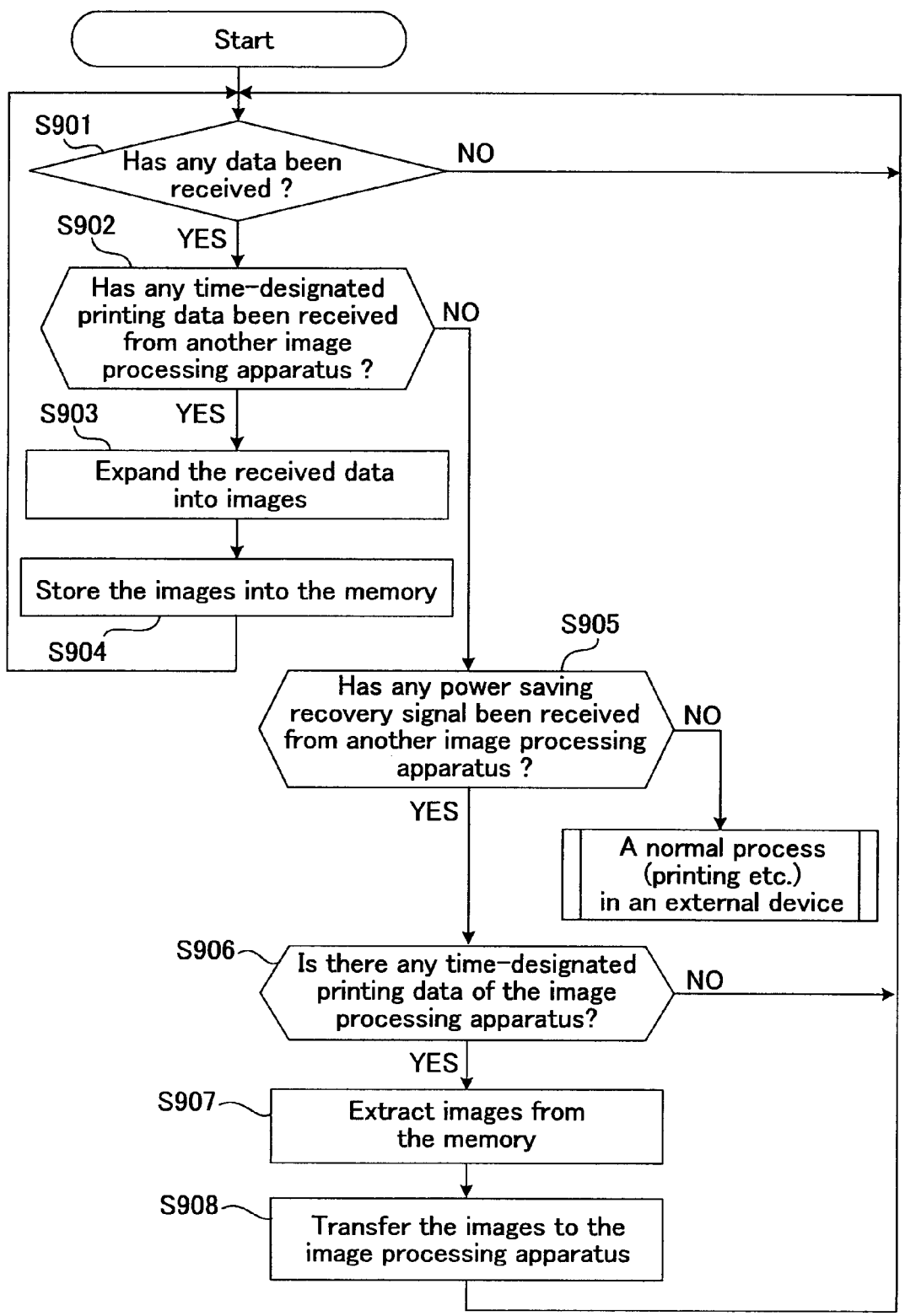
FIG. 9 is a flow chart showing a received data processing effected in an external device of the same embodiment.

Next, the operation of the image processing in external devices 20 and 30 provided for image processing system 100 in the present embodiment will be described with reference to the drawings. FIG. 9 is a flow chart showing the processing of received data effected by the external device of the present embodiment.

In external devices 20 and 30, including a printer 20 and PCs 30, connected to image processing apparatus 10 of the present embodiment via communication network N1, first it is checked at received data analyzer 25(35) (FIG. 4) whether there has been any reception of image data (Step S901).

When reception of image data is detected at Step S901, it is determined by received data analyzer 25(35) whether the image data is time-designated printing data from a separate image processing apparatus, or more specifically, whether the image data is time-designated printing data transferred from image processing apparatus 10 via communication network N1 (Step S902).

When the received image data is determined to be time-designated printing data from separate image processing apparatus 10 connected via communication network N1 at Step S902, the received data, that is, the time-designated printing data is expanded by image data expansion processor 26(36) into data of printable images (Step S903), then the images are stored into memory 23 (33) to be the image data storage (Step S904).

On the other hand, if it is determined at Step S902 that the received image data is not time-designated printing data from separate image processing apparatus 10, then it is determined at power saving recovery monitor 24(34) whether a power saving recovery signal from power saving recovery notifier 15*b*2 of the separate image processing apparatus 10 has been received (Step S905).

When reception of a power saving recovery signal from power saving recovery notifier 15*b*2 is detected by power saving recovery monitor 24(34), it is checked whether any time-designated printing data transferred from the image processing apparatus 10 is present in image data storage 23(33) as the memory of external device 20(30) (Step S906).

Alternatively, when no reception of a power saving recovery signal from the power saving recovery notifier 15*b*2 is detected by power saving recovery monitor 24(34), a usual process of printing etc. at the external device 20(30) is executed.

When it is determined at Step S906 that there is time-designated printing data transferred from image processing apparatus 10, the stored image data is extracted from memory 23(33) of external device 20(30) (Step S907) and the data of images is transferred to image processing apparatus 10 from which the data was originally transferred (Step S908). On the other hand, when no time-designated printing data transferred from image processing apparatus 10 is detected at Step S906, the operation returns once again to Step S901.

Figure 10:
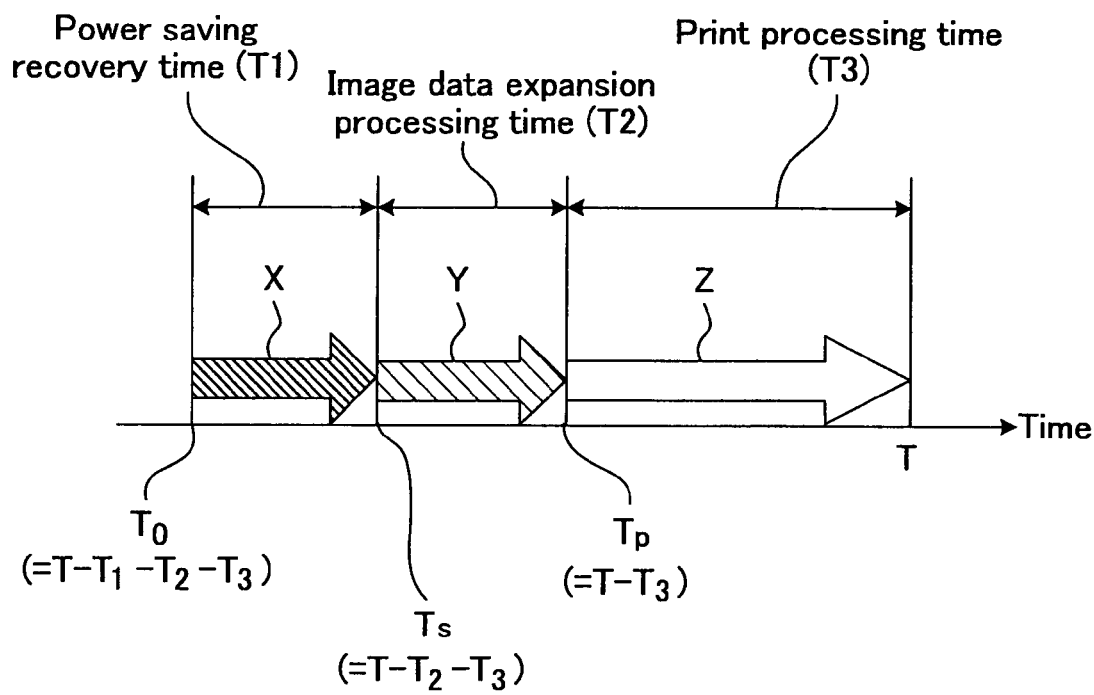
FIG. 10 is an illustrative view of a time sequence chart of the rules for illustrating time-designated printing of image data including time-designated printing data when the image processing apparatus of the present embodiment recovers from the power saving mode.
Figure 11:
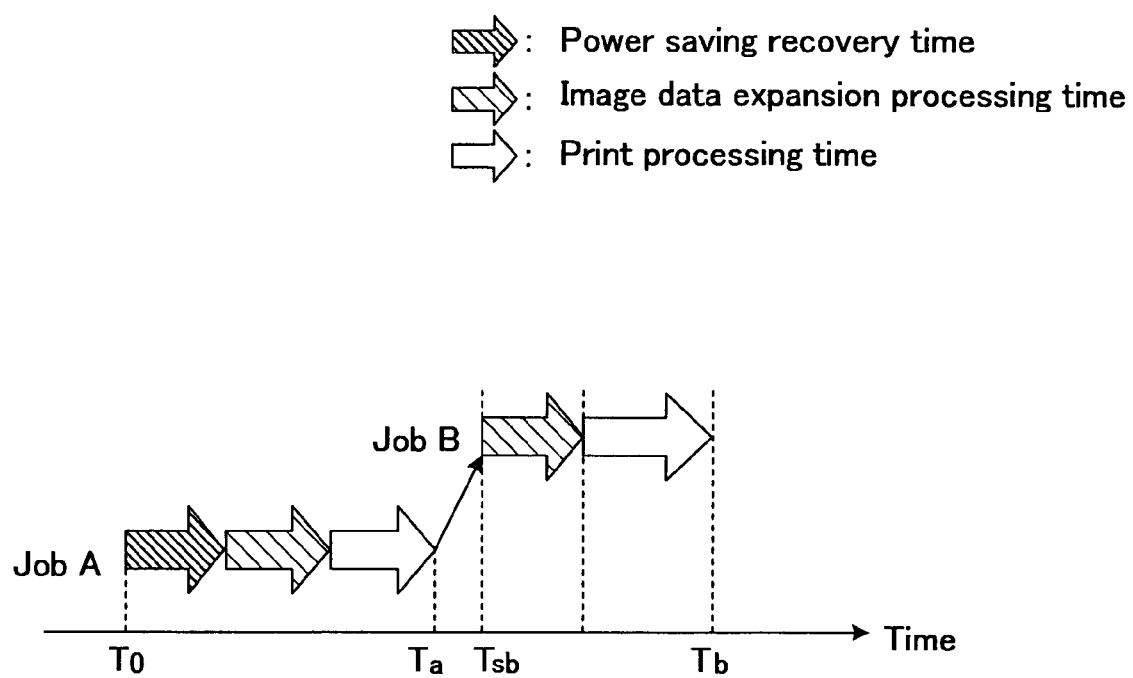
FIG. 11 is a time sequence chart for time-designated printing when the starting time of an image data expansion process of Job B is later than the print completion time of Job A.
Figure 12:
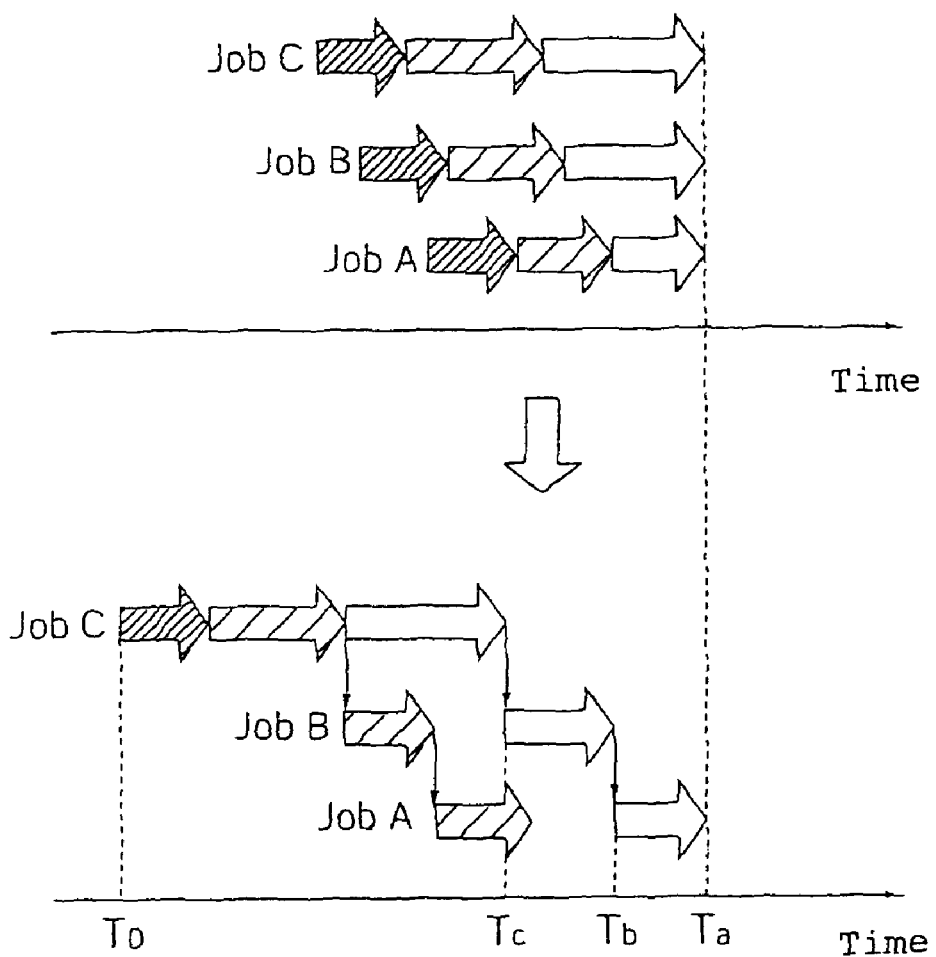
FIG. 12 is a time sequence chart for time-designated printing when Job A, Job B and Job C are to be completed at the same print completion time.
Figure 13:
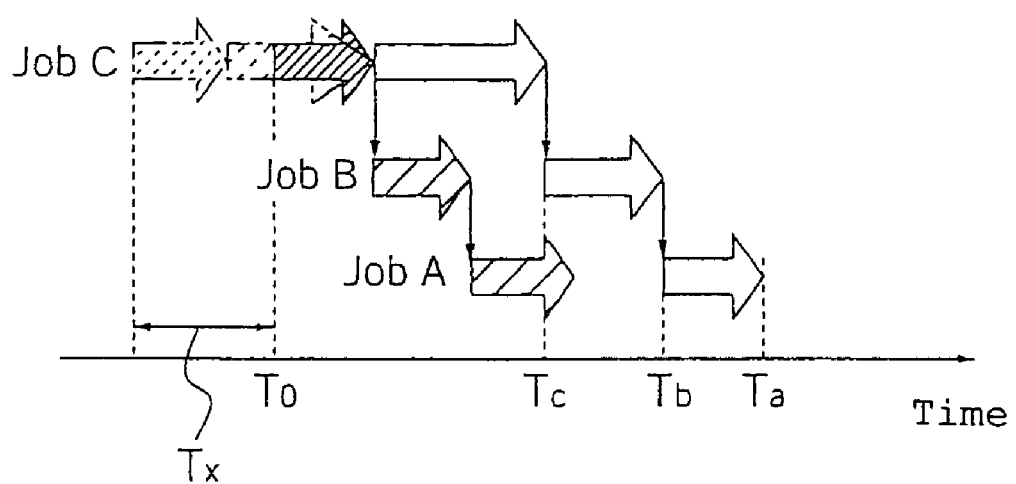
FIG. 13 is a time sequence chart for time-designated printing when an image data expansion process of time-designated printing data of Job C is executed by an external device.
Figure 14:
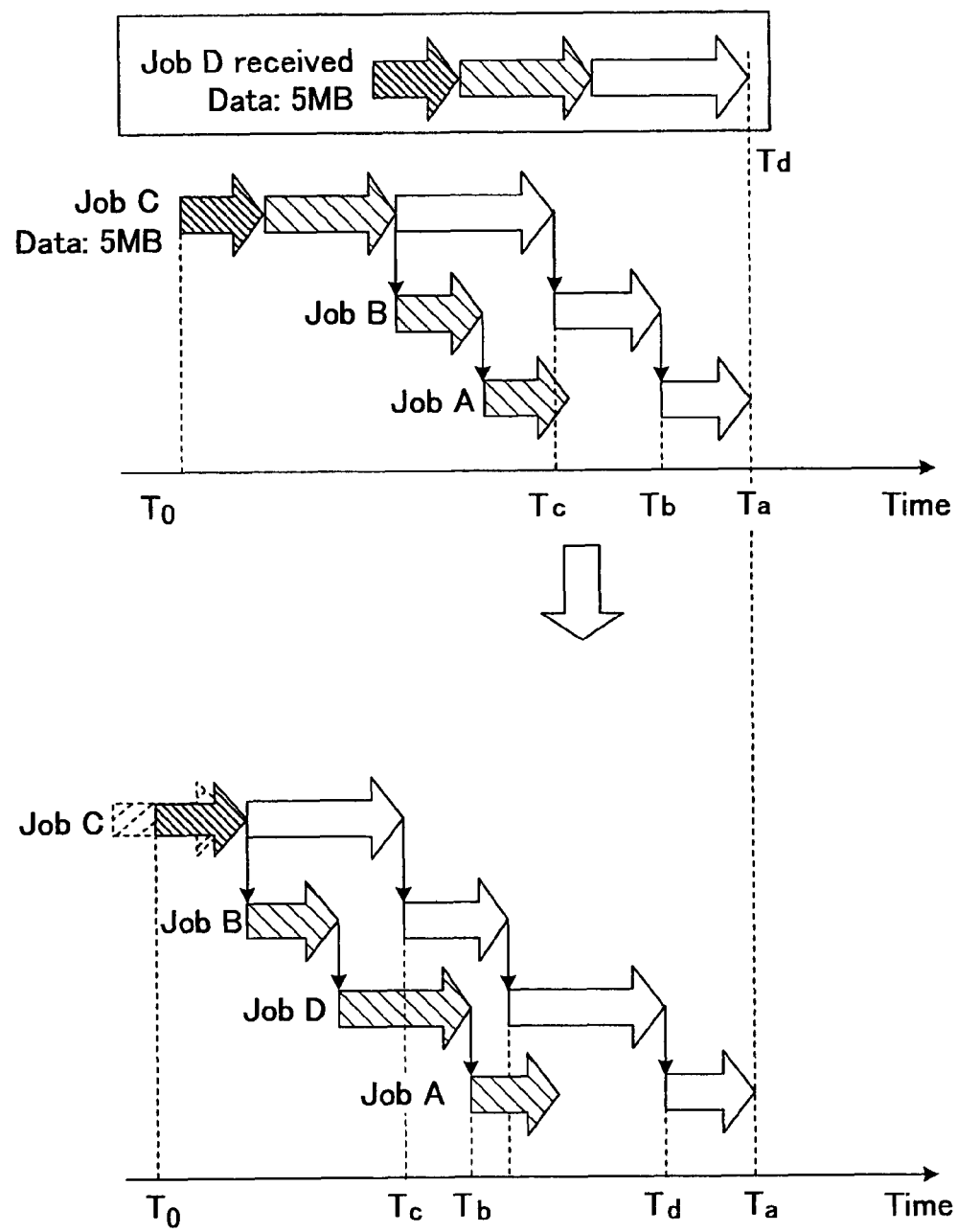
FIG. 14 is a time sequence chart for time-designated printing when Job D is received with the memory on the sub board being full.

Next, the operation of performing time-designated printing of time-designated printing data when image processing apparatus 10 of the present embodiment recovers from the power saving mode will be described with reference to time sequence charts. FIG. 10 is an illustrative view of a time sequence chart of the rules for illustrating time-designated printing of time-designated printing data when the image processing apparatus of the present embodiment recovers from the power saving mode. FIG. 11 is a time sequence chart for time-designated printing when the starting time of the image data expansion process of Job B is later than the print completion time of Job A. FIG. 12 is a time sequence chart for time-designated printing when Job A, Job B and Job C are to be completed at the same print completion time. FIG. 13 is a time sequence chart for time-designated printing when the image data expansion process of time-designated printing data of Job C is executed by an external device. FIG. 14 is a time sequence chart for time-designated printing when Job D is received with the memory on the sub board being full.

In a case where time-designated printing data has been received as the image data of one print job when the image processing apparatus 10 of the present embodiment is in the power saving mode, image processing apparatus 10 recovers from the power saving mode when scheduled power saving recovery time T0 calculated at received data analyzer 15*b*1 on sub board 11*b* has arrived. Then, the data is expanded in to data of images that are printable by image data expansion processor 15*a*1 provided on main board 11*a* of image processing apparatus 10, and the images are transmitted to the subsequent image forming portion to be printed out.

In the time sequence chart in FIG. 10 for illustrating time-designated printing of time-designated printing data when the image processing apparatus 10 of the present embodiment recovers from the power saving mode, power saving recovery time T1 is shown by a densely hatched thick arrow X, image data expansion processing time T2 is shown by a lightly hatched thick arrow Y, and print processing time T3 is shown by an outlined thick arrow Z.

Power saving recovery time T1 is the time required for image processing apparatus 10 to recover from the power saving mode to normal mode by restoring power supply to main board 11*a*, and takes an approximately fixed value for individual image processing apparatus 10.

Image data expansion processing time T2 is the time required for a set of time-designated printing data to be expanded into data of printable images, by image data expansion processor 15*a*1 of image processing apparatus 10 or by image data expansion processor 26 or 36 of external device 20 or 30. This image data expansion processing time T2 depends on the image data size of the received print job, and is calculated by received data analyzer 15*b*1 when a print job is received by sub ASIC 15*b*, based on the image data size of the received print job. That is, the length of image data expansion processing time T2 varies depending on the image data size of the print job, or the greater the image data is, the longer the image data expansion processing time T2 becomes.

Print processing time T3 is the time required for the images of the image data (time-designated printing data) image-processed in image processing apparatus 10 to be printed out in the subsequent image forming portion. Similarly to the image data expansion processing time, print processing time T3 depends on the image data size of the received print job and the number of copies to be printed, and is calculated by received data analyzer 15b1 when a print job is received by sub ASIC 15b, based on the image data size of the received print job and the number of copies to be printed. That is, the length of print processing time T3 varies depending on the image data size of the print job and the number of copies to be printed, or the greater the image data is and the greater the number of copies to be printed, the longer print processing time T3 becomes.

As described above, power saving recovery time T1 is an approximately fixed value for individual image processing apparatus 10, whereas image data expansion processing time T2 and print processing time T3 take values depending on the image data size of a received print job and the number of copies to be printed. Therefore, when image processing apparatus 10 receives time-designated printing data as a print job of image data during the power saving mode, scheduled power saving recovery time T0 of the print job is calculated from the print completion time T written in the received data list of print jobs, created in sub memory 14b, based on the image data size and the number of copies to be printed, detected by received data analyzer 15b1. For example, since power saving recovery time T1 is an approximately fixed value for individual image processing apparatus 10 while image data expansion processing time T2 and print processing time T3 can be calculated by received data analyzer 15b1 when a print job is received based on the size of image data and the number of copies to be printed in the print job, the starting time of print processing, Tp is calculated by T−T3, the starting time of image data expansion, Ts is given by T−T2−T3, and scheduled power saving recovery time T0 is given by T−T1−T2−T3.

As shown in FIG. 11, when there are two print jobs, namely, Job A and Job B, to be printed at designated times after power saving recovery and when the image data expansion of Job B starts at Tsb after the print completion time Ta of Job A, image processing apparatus 10 is restored first from the power saving mode using power saving recovery time T1, then the image data of Job A which is scheduled to be printed first is expanded into data of printable images by image data expansion processor 15a1. After expansion of the image data of Job A into data of printable images, its image printing is performed at the image forming portion that follows so that the printing process of the images is completed at print completion time Ta.

Thereafter, when the starting time of the image data expansion process of Job B, Tsb, has arrived, the image data of Job B is expanded into data of printable images, by image data expansion processor 15a1 on main board 11a. After expansion of the image data of Job B into data of printable images, its image printing is performed at the image forming portion that follows so that the printing process of the images is completed at print completion time Tb.

In the above way, when the expansion process of the image data of the second print job of two print jobs starts after completion of the printing of the first job, the image expansion processes of the two print jobs can be executed in serial order, so that the printing processes can also be done in the same order.

On the other hand, as shown at the top side in FIG. 12, when there are three print jobs, namely Job A, Job B and Job C, to be printed at designated times after power saving recovery and when these three print jobs are specified to be completed at the same time, it is impossible for image data expansion processor 15a1 to perform parallel expansion processes of multiple sets of image data at the same time as stated above. In addition, the image forming portion that performs image printing also cannot perform parallel printing processes of multiple sets of images at the same time. Accordingly, Job A, Job B and Job C are scheduled and executed in such a manner, as shown at the bottom side of FIG. 12, that all the three print jobs can be completed by the designated print completion time.

Describing specifically, when power saving recovery time T1 for restoring image processing apparatus 10 from the power saving mode has elapsed first, then the image data of Job C, whose scheduled power saving recovery time arrives first because its image data size is the greatest among the three print jobs, is expanded into data of printable images by image data expansion processor 15a1.

After completion of expanding the image data of Job C into data of printable images, the subsequent image forming portion starts a printing process of the images. At the same time, the image data of Job B, whose scheduled power saving recovery time arrives second to Job C because its image data size is the second greatest to Job C, is expanded by image data expansion processor 15a1 into data of printable images. That is, since the expansion process of image data and the printing process of images are effected independently by different processors, the two can progress in parallel.

After completion of expanding the image data of Job B into data of printable images, the image data of Job A, whose scheduled power saving recovery time arrives last because its image data size is the smallest among the three print jobs, is expanded into data of printable images by image data expansion processor 15a1.

On the other hand, in the image forming portion, printing of Job C is started first. Then, after completion of printing of Job C (at print completion time Tc), printing of following Job B is started. Then, after completion of printing of Job B (at print completion time Tb), printing of the images of the following Job A is started and completed at print completion time Ta.

In the above way, since the expansion process of image data and the printing process of images are independently achievable, it is possible to effect a printing process of one print job while performing an image data expansion process of another print job. That is, in the case where the print completion times of three print jobs are the same, image expansion processes of the print jobs can be effected continuously one to another or serially while their printing processes can be done in serial order from the print job of which expansion of the image data into data of images that is printable has been completed first. In the course of this operation, by starting the image expansion process of the following print job as soon as the image expansion process of a preceding print job is completed, the printing process of each job can be finished more quickly. Accordingly, the time from scheduled power saving recovery time T0 to print completion time Ta at which the printing of the last print job is completed can be shortened, so that it is possible to stop power supply to main board 11a of image processing apparatus 10 for longer time, hence keep up the power saving mode function for longer time.

In contrast to the above, in order to complete time-designated printing of three print jobs, or Job A, Job B and Job C by the designated print completion time, there can be a case where, as shown in FIG. 13, an expansion process of the image data of Job C that includes time-designated printing data representing that its print completion time arrives first because its power saving recovery time is the earliest, is made to be done by external device 20(30) provided with image data expansion processor 26(36). In this case, it is possible to make external device 20(30) complete the expansion process of the image data of Job C before main board 11a of image processing apparatus 10 recovers from the power saving mode. Accordingly, if Job C is returned from external device 20(30) during the power saving mode before power saving recovery time T1 (FIG. 10) of main board 11*a* has elapsed, its printing process can be started immediately after the power saving recovery time T1 has elapsed. In addition, when printing of Job C starts, at the same time the image data expansion process of the following Job B is started.

Here, in order to return the expanded data in the form of printable images of Job C to sub board 11*b* before power saving recovery time T1 elapses, it is preferable that power saving recovery notifier 15*b*2 is adapted to transmit a power saving recovery signal to external device 20(30) in advance, based on the received data list of time-designated printing jobs that has been prepared based on the data analysis by received data analyzer 15*b*1.

Since transmission of a power saving recovery signal in this way assures transfer of expansion-processed Job C from external device 20(30) to image processing apparatus 10 before the lapse of power saving recovery time T1, it is possible to positively complete printing by the designated print completion time as well as to make the flow of print processing smooth. For example, when image processing apparatus 10 recovers from the power saving mode earlier than the designated power saving mode recovery time due to some other reasons such as normal reception of printing data or a recovery request through the control panel, it is possible for external device 20(30) at the forwarded destination of time-designated printing data to know the timing of power saving mode recovery of the image processing apparatus 10, from the power saving recovery signal from power saving recovery notifier 15*b*2. Accordingly, when external device 20(30) holds some time-designated printing data that was transferred from image processing apparatus 10, external device 20(30) can return the time-designated printing data being held therein to image processing apparatus 10 in time with the power saving mode recovery of image processing apparatus 10. Hence, this not only guarantees completion of the printing of the time-designated printing data that was transferred to external device 20(30), by the designated print completion time but can also reduce the processing on external device 20(30). In this case, it is assumed that when Job C is returned to the original forwarder, i.e., image processing apparatus 10, Job C is sent back taking into account the transfer time from external device 20(30) to image processing apparatus 10.

After the image data of Job B has been expanded into data of printable images, the expansion process for the image data of the following Job A is started so that the image data is expanded by image data expansion processor 15*a*1 into data of printable images.

On the other hand, in the image forming portion side, printing of Job C is started first. Then, after completion of printing of Job C (at print completion time Tc), printing of following Job B is started. Then, after completion of printing of Job B (at print completion time Tb), printing of the images of following Job A is started and completed at print completion time Ta. That is, printing of the print jobs is effected serially.

In the above way, when, in order to complete time-designated printing of three print jobs, or Job A, Job B and Job C by the designated print completion time, the time-designated printing data of Job C whose print completion time arrives first is made to be expanded by external device 20 or 30, the expanding process of the time-designated printing data of Job C is completed during the period in which main board 11*a* is in the power saving mode. As a result, it is possible to shorten the time from when main board 11*a* starts image processing until the printing process at the image forming portion is completed, by Tx, the time taken for the image data expanding process of Job C, as shown in FIG. 13. That is, it is possible to lengthen the power saving mode duration of image processing apparatus 10 by Tx, the time taken for the image data expanding process of Job C.

In another case where Job D is received when received data storage (sub memory) 14*b* of sub board 11*b* is full with data of Job A, Job B and Job C as shown in FIG. 14 and still the main board 11*a* is wanted to be kept in the power saving mode, it is necessary to transfer at least one of print jobs, among the received Job D and the print jobs being stored in sub memory 14*b* or Job A, Job B and Job C, to external device 20(30).

In selecting print jobs to be transferred to external device 20(30), in order to prevent the apparatus from recovering from the power saving mode or keep up the power saving mode status as long as possible, transfer of print jobs is performed in the order of the earliest print completion time. In the example shown in FIG. 14, since the print starting time of Job C is the earliest, Job C is transferred to external device 20(30) first. Then, since Job C whose print completion time is earliest among the print jobs stored in sub memory 14*b* and the received Job D both have the same data size (5 MB), Job C is transferred to external device 20(30) and Job D is stored into sub memory 14*b* instead of Job C. Here, in the example shown in FIG. 14, since Job C and Job D have the same data size, it is not necessary to transfer any other job. However, if Job D has a greater data size than Job C, it is necessary to transfer Job B whose print starting time is second earliest to Job C in order to prevent main board 11*a* from recovering from the power saving mode.

When main board 11*a* of image processing apparatus 10 recovers from the power saving mode, the expansion process of the image data of Job C has been already completed by external device 20(30) at the forwarding destination while main board 11*a* has been in the power saving mode. Therefore, after the lapse of power saving recovery time T1 (FIG. 10) of main board 11*a*, the printing process of Job C which has been already expanded into data of printable images is started. In this case, it is acceptable that the data of printable image of Job C that was expanded at external device 20(30) was received by sub board 11*b* in the duration of the power saving recovery time T1. Also, when printing of Job C starts, at the same time the image data expansion process of the following Job B is started.

Here, in order to return the expanded data in the form of printable images of Job C to sub board 11*b* before power saving recovery time T1 elapses, it is preferable that power saving recovery notifier 15*b*2 is adapted to transmit a power saving recovery signal to external device 20(30) in advance, in accordance with the received data list of time-designated printing jobs that is prepared based on the data analysis by received data analyzer 15*b*1. Transmission of a power saving recovery signal in this way assures transfer of expansion-processed Job C from external device 20(30) to image processing apparatus 10 before the lapse of power saving recovery time T1, it is possible to positively complete printing by the designated print completion time as well as to make the flow of print processing smooth. In this case, it is assumed that Job C is sent back taking into account the transfer time from external device 20(30) to image processing apparatus 10.

After the image data of Job B has been expanded into data of printable images, among Job A and Job D having the same print completion time the expansion process for the image data of Job D, which needs a greater time for image processing than Job A, is started. After completion of the expansion process of the image data of Job D, the expansion process of the image data of Job A is started.

On the other hand, on the image forming portion side, printing of Job C is started first. Then, after completion of printing of Job C (at print completion time Tc), printing of following Job B is started. Then, after completion of printing of Job B (at print completion time Tb), printing of following Job D is started. Further, after completion of printing of Job D (at print completion time Td), printing of following Job A is started and completed at print completion time Ta.

In the above way, in a case where Job D is received from external device 20(30) with sub memory 14b being full with image data of Job A, Job B and Job C including time-designated printing data, Job C whose print completion time arrives first, is extracted and transferred so as to make external device 20(30) effect the expansion process of time-designated printing data of Job C. Then, at external device 20(30), the expansion process of the image data is completed, so that the expansion-processed Job C is made to be transferred to image processing apparatus 10 by the time when power saving recovery time T1 of main board 11a has elapsed. As a result, it is possible to shorten the time from when main board 11a starts image processing until the printing process at the image forming portion is completed, by Tx, the time taken for the image data expanding process of Job C. That is, it is possible to lengthen the power saving mode duration of image processing apparatus 10 by Tx, the time taken for the image data expanding process of Job C.

As described heretofore, in the first embodiment of the present invention, when the image processing apparatus with its sub memory full with the received jobs of data, receives a printing job of image data including time-designated printing data in the power saving mode, the printing job of image data that will be completed first is extracted from the printing jobs of image data stored in sub memory 14b and the latest received printing job of image data and is transferred to external device 20(30) first. However, the way of relocating the printing jobs in the power saving mode is not limited to this.

For example, the printing job of image data that will take the longest time for expansion processing may be transferred to external device 20(30) first before other jobs. Illustratively, in a case where the sub memory has held a plurality of printing jobs of time-designated printing data, specifically, Job A (print completion time: 17:01, data size: 2 MB), Job B (17:02, 3 MB), Job C (17:03, 5 MB) and Job D (17:04, 10 MB) when the apparatus is in the power saving mode, when the sub memory receives another job, namely Job E (print completion time: 17:05, data size: 2 MB), in its memory-full state, instead of Job A which is scheduled to be printed out first, Job D which will take the longest time for expansion of time-designated printing data because its data size is greatest may be transferred to an external device.

In this way, even if a number of print jobs have been reserved densely at almost the same time within a short period, it is acceptable as long as each print job will have been absolutely completed before its designated time. Accordingly, if Job D which is large in data size, hence needs time for expansion of image data is transferred to an external device while the apparatus is in the power saving mode so that the expanding process of the time-designated printing data of Job D is completed in advance during the period of the power saving mode and the resultant expanded data is returned to the image processing apparatus, it is possible to start the subsequent printing process by omitting the expansion process of the time-designated printing data of Job D on the main board. Resultantly, it is possible to reduce the time from when the main board is restored from the power saving mode until printing of all the printing jobs is completed, by the time required for the expanding process of the time-designated printing data of Job D, hence it is possible to keep up the image processing apparatus in the power saving mode for a longer duration.

Further, in the case where a number of print jobs have been reserved densely at almost the same time within a short period of time, despite the sub memory being not full of data, the time-designated printing data of Job B and Job D, for instance may be transferred to external devices in order to reliably complete the printing process of individual print jobs before their respective designated print completion times. Thus, by completing the expanding process of the time-designated printing data of these jobs in advance during the period of the power saving mode and returning the resultant expanded data to the image processing apparatus, it is possible to keep up the main board in the power saving mode for a longer duration by the time to be taken for the expanding processing of time-designated printing data of these transferred printing jobs.

Moreover, in a case where the sub memory holds time-designated printing data for a number of printing jobs that should be completed at a certain time, even if it takes long time to perform the image expansion process of the time-designated printing data of each print job and perform the printing process of the images, it is possible to keep the scheduled print completion time with strict punctuality.

In some conditions under which a number of printing jobs of time-designated printing data to be completed concentratedly at a certain time are received, there are cases where a preferable result can be obtained if all the jobs of time-designated printing data having been received in the duration of the power saving mode are transferred to external devices 20(30). For example, when punctuality in keeping the print completion time of each print job is strictly demanded and hence all the print jobs of time-designated printing data are transferred to external devices, or when a print job having a data size exceeding the capacity of sub memory 14b on sub board 11b is received and hence needs to be transferred to external device 20(30), it is preferable to transfer all the time-designated printing data to external devices 20(30). In such a case, all the print jobs will be transferred to external devices 20(30).

Having described preferred embodiments of the present invention with reference to the accompanying drawings, it goes without saying that the present invention should not be limited to the above-described examples. It is obvious that various changes and modifications will occur to those skilled in the art within the scope of the appended claims. Such variations are therefore understood to be within the technical scope of the present invention.

For example, though the first embodiment is described taking a case where a PC is used as the external device that transmits a print job to the image processing apparatus, information devices and image processing apparatus, such as facsimile machines, scanners and the like other than PCs, with a driver program (printer driver) for transmitting a print job to the image processing apparatus by way of a communication network, installed beforehand may be used as the external device for transmitting a print job.

What is claimed is:

1. An image processing apparatus, connected to a plurality of external devices by way of a communication network so as to be able to exchange image data therewith, the apparatus including:

a main board for expanding the image data received as a print job from one of the external devices into data of printable images;

a sub board having a function of connection with the communication network; and a power saving mode function for supplying electric power to the sub board only, by cutting off power supply to the main board when the image processing operation has been stopped for a predetermined duration, characterized in that the sub board comprises a received data analyzer, the received data analyzer comprising:

a time-designated printing data storage which, when time-designated printing data is received as the image data during the power saving mode or while the power saving mode function is activated, stores each time-designated printing data received as a set of time-designated printing data having a data size;

a time-designated printing data extracting portion for extracting, in accordance with a predetermined condition, at least one set of time-designated printing data from (i) the sets of time-designated printing data being stored in the time-designated printing data storage and (ii) a newly received set of time-designated printing data having a received data size; and a time-designated printing data forwarding portion for transferring the at least one set of time-designated printing data extracted at the time-designated printing data extracting portion to an external device that is different from the external device from which the image data was originally transmitted, wherein the time-designated printing data extracting portion extracts sets of time-designated printing data in the order in which the print completion time is earliest, from the sets of time-designated printing data being stored in the time-designated printing data storage and the newly received set of time-designated printing data, wherein the sub board includes a power saving mode recovery notifier for transmitting a power saving mode recovery signal to the external device to which the set of time-designated printing data was transferred when the apparatus is recovered from the power saving mode.

2. The image processing apparatus according to claim 1, wherein the predetermined condition is the condition that holds when the time-designated printing data extracting portion determined that the received data size of the newly received set of time-designated printing data is greater than the empty capacity of the time-designated printing data storage.

3. The image processing apparatus according to claim 1, wherein the time-designated printing data extracting portion includes a power saving mode recovery time calculating portion for calculating, based on the received data size of the received set of time-designated printing data, the power saving mode recovery time at which the main board will recover from the power saving mode function.

4. The image processing apparatus according to claim 1, wherein the external device to which the set of time-designated printing data is transferred by the time-designated printing data forwarding portion includes an image data expansion processor for expanding the time-designated printing data into data of printable images.

5. An image processing system comprising: a plurality of external devices capable of exchanging image data; and an image processing apparatus including a main board for expanding the image data received as a print job by way of a communication network from one of the external devices into data of printable images and a sub board having a function of connection with the communication network, characterized in that the image processing apparatus includes: a power saving mode function for supplying electric power to the sub board only by cutting off the power supply to the main board when the image processing operation has been stopped for a predetermined duration, and the sub board comprises a received data analyzer, the received data analyzer comprising: a time-designated printing data storage which, when time-designated printing data is received as the image data while the power saving mode function is activated, stores each time-designated printing data received as a set of time-designated printing data having a data size; a time-designated printing data extracting portion for extracting, in accordance with predetermined conditions, at least one set of time-designated printing data from (i) the sets of time-designated printing data being stored in the time-designated printing data storage and (ii) a newly received set of time-designated printing data having a received data size; and a time-designated printing data forwarding portion for transferring the at least one set of time-designated printing data extracted at the time-designated printing data extracting portion to an external device that is different from the external device from which the image data was originally transmitted, and the external device includes an image data expanding portion for expanding the at least one set of time-designated printing data transferred from the image processing apparatus into data of printable images; wherein the sub board includes a power saving mode recovery notifier for transmitting a power saving mode recovery signal to the external device to which the set of time-designated printing data was transferred when the apparatus is recovered from the power saving mode.

6. An image processing method of expanding image data received as a print job via a communication network from one of a plurality of external devices that can exchange image data, comprising:

a power saving mode entering step for entering a power saving mode when the image processing operation has been stopped for a predetermined period, in which electric power is supplied to a sub board that has a connecting function with the communication network alone while power supply to a main board for expanding the image data into data of printable images is cut off;

a time-designated printing data storing step which, when time-designated printing data is received as the image data after the power saving mode entering step, stores the time-designated printing data into a time-designated printing data storage received as a set of time-designated printing data having a data size;

a time-designated printing data extracting step for extracting, at least one set of time-designated printing data from (i) the sets of time-designated printing data being stored in the time-designated printing data storage and (ii) a newly received set of time-designated printing data having a received data size, in accordance with a predetermined condition;

a time-designated printing data forwarding step for transferring the at least one set of time-designated printing data extracted at the time-designated printing data extracting step to an external device that is different from the external device from which the image data was originally transmitted;

a first image data expansion processing step for expanding at least one the set of time-designated printing data received by the external device after the time-designated printing data forwarding step, into data of printable images;

a power saving mode recovery step for recovering the main board from the power saving mode;

a power saving mode recovery notifying step for transmitting a power saving mode recovery signal to the external device to which the set of time-designated printing data was forwarded, after the power saving mode recovery step; and a second image expansion processing step for causing the main board to expand the sets of time-designated printing data stored in the time-designated printing data storage into data of printable images, after the power saving mode recovery step.

7. The image processing apparatus according to claim 2, wherein the time-designated printing data extracting portion includes a power saving mode recovery time calculating portion for calculating, based on the received data size of the received set of time-designated printing data, the power saving mode recovery time at which the main board will recover from the power saving mode function.

8. An image processing apparatus, connected to a plurality of external devices by way of a communication network so as to be able to exchange image data therewith, the apparatus including:

a main board for expanding the image data received as a print job from one of the external devices into data of printable images;

a sub board having a function of connection with the communication network; and a power saving mode function for supplying electric power to the sub board only, by cutting off power supply to the main board when the image processing operation has been stopped for a predetermined duration, characterized in that the sub board comprises a received data analyzer, the received data analyzer comprising:

a time-designated printing data storage which, when time-designated printing data is received as the image data during the power saving mode or while the power saving mode function is activated, stores each time-designated printing data received as a set of time-designated printing data having a data size;

a time-designated printing data extracting portion for extracting, in accordance with a predetermined condition, at least one set of time-designated printing data from (i) the sets of time-designated printing data being stored in the time-designated printing data storage and (ii) a newly received set of time-designated printing data having a received data size; and a time-designated printing data forwarding portion for transferring the at least one set of time-designated printing data extracted at the time-designated printing data extracting portion to an external device that is different from the external device from which the image data was originally transmitted, wherein when plural sets of time-designated printing data have the same print completion time, the time-designated printing data extracting portion extracts sets of time-designated printing data in the order in which the data size is greatest, wherein the sub board includes a power saving mode recovery notifier for transmitting a power saving mode recovery signal to the external device to which the set of time-designated printing data was transferred when the apparatus is recovered from the power saving mode.

* * * * *